United States Patent
Vora et al.

(10) Patent No.: US 11,258,671 B1
(45) Date of Patent: Feb. 22, 2022

(54) FUNCTIONALITY MANAGEMENT FOR DEVICES

(71) Applicant: Amazon Technologies, Inc., Seattle, WA (US)

(72) Inventors: Jigar Vora, San Mateo, CA (US); Makarand Damle, Sunnyvale, CA (US); Aditya Bhave, Santa Clara, CA (US); Ankit Premrajka, Sunnyvale, CA (US); Olusanya Temitope Soyannwo, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 16/134,639

(22) Filed: Sep. 18, 2018

(51) Int. Cl.
| | | |
|---|---|---|
| *H04L 12/24* | (2006.01) | |
| *H04W 4/80* | (2018.01) | |
| *G10L 15/22* | (2006.01) | |
| *G10L 15/30* | (2013.01) | |
| *G10L 15/18* | (2013.01) | |
| *H04W 84/20* | (2009.01) | |
| *H04L 41/12* | (2022.01) | |

(52) U.S. Cl.
CPC .......... *H04L 41/12* (2013.01); *G10L 15/1815* (2013.01); *G10L 15/22* (2013.01); *G10L 15/30* (2013.01); *H04W 4/80* (2018.02); *G10L 2015/223* (2013.01); *H04W 84/20* (2013.01)

(58) Field of Classification Search
CPC ........ H04L 41/12; H04W 4/80; H04W 84/20; G10L 15/1815; G10L 15/22; G10L 15/30; G10L 2015/223
See application file for complete search history.

(56) References Cited

U.S. PATENT DOCUMENTS

| | | | |
|---|---|---|---|
| 9,280,973 B1 * | 3/2016 | Soyannwo | G10L 15/30 |
| 9,392,320 B1 * | 7/2016 | Damle | H04N 21/422 |
| 9,426,185 B1 * | 8/2016 | Vora | H04L 63/0492 |
| 9,491,033 B1 * | 11/2016 | Soyannwo | H04W 4/026 |
| 9,728,188 B1 * | 8/2017 | Rosen | G10L 25/51 |
| 10,080,193 B1 * | 9/2018 | Bleu-Laine | H04W 52/0212 |
| 10,102,855 B1 * | 10/2018 | Sindhwani | G10L 15/22 |
| 10,157,614 B1 * | 12/2018 | Devaraj | G10L 15/22 |
| 10,192,553 B1 * | 1/2019 | Chenier | G10L 15/22 |
| 10,200,724 B1 * | 2/2019 | Pogue | H04N 21/233 |
| 10,271,093 B1 * | 4/2019 | Jobanputra | H04N 21/439 |
| 10,276,185 B1 * | 4/2019 | Ma | G10L 21/04 |
| 10,333,998 B1 * | 6/2019 | Chiu | G10L 15/26 |
| 10,339,957 B1 * | 7/2019 | Chenier | H04L 67/306 |
| 10,404,832 B2 * | 9/2019 | Vora | H04L 67/2823 |

(Continued)

*Primary Examiner* — William G Trost, IV
*Assistant Examiner* — Monishwar Mohan
(74) *Attorney, Agent, or Firm* — Lee & Hayes, P.C.

(57) ABSTRACT

Systems and methods for functionality management of devices are disclosed. Multiple computing devices may be located in the same environment and/or space and at least two of those computing devices may be configured to perform a given functionality. In these and other examples, one of the devices may be identified as a primary device and the other devices may be identified as secondary devices based on, for example, historical usage data, audio-signal data, computer-vision analysis, and/or one or more other criteria. The functionality may be disabled on the secondary devices until the secondary devices are utilized and/or until a triggering event occurs.

19 Claims, 14 Drawing Sheets

(56) References Cited

U.S. PATENT DOCUMENTS

| | | | |
|---|---|---|---|
| 10,412,206 B1* | 9/2019 | Liang | H04M 3/42068 |
| 2013/0080669 A1* | 3/2013 | Cole | G06F 13/426 |
| | | | 710/110 |
| 2013/0159565 A1* | 6/2013 | Soyannwo | G09G 5/006 |
| | | | 710/33 |
| 2014/0273858 A1* | 9/2014 | Panther | A61B 5/4812 |
| | | | 455/41.2 |
| 2015/0163788 A1* | 6/2015 | Karunakaran | H04L 67/28 |
| | | | 370/254 |
| 2017/0060629 A1* | 3/2017 | Vora | G06F 9/4881 |
| 2017/0064045 A1* | 3/2017 | Pai | H04L 69/08 |
| 2017/0180033 A1* | 6/2017 | Tobin | H04W 40/22 |
| 2018/0047386 A1* | 2/2018 | Garner | G10L 15/08 |
| 2018/0088902 A1* | 3/2018 | Mese | G10L 15/22 |
| 2018/0152557 A1* | 5/2018 | White | G10L 15/26 |
| 2018/0211665 A1* | 7/2018 | Park | G10L 15/26 |
| 2018/0233147 A1* | 8/2018 | Tukka | G06F 3/167 |
| 2018/0262469 A1* | 9/2018 | Rane | G06F 21/6263 |
| 2018/0295224 A1* | 10/2018 | VanBlon | H04M 1/571 |
| 2018/0330589 A1* | 11/2018 | Horling | G06F 3/167 |
| 2018/0335903 A1* | 11/2018 | Coffman | C08F 232/08 |
| 2019/0074003 A1* | 3/2019 | Guthery | G10L 15/285 |
| 2019/0130906 A1* | 5/2019 | Kobayashi | G10L 15/08 |
| 2019/0179607 A1* | 6/2019 | Thangarathnam | G06F 3/167 |
| 2019/0179610 A1* | 6/2019 | Aiken | G06F 3/167 |
| 2019/0179611 A1* | 6/2019 | Wojogbe | G06F 3/167 |
| 2019/0237069 A1* | 8/2019 | Zhao | G06F 40/55 |
| 2019/0251960 A1* | 8/2019 | Maker | G10L 15/08 |
| 2019/0273963 A1* | 9/2019 | Jobanputra | G06F 40/35 |
| 2019/0311720 A1* | 10/2019 | Pasko | G06F 3/167 |
| 2019/0325120 A1* | 10/2019 | Fritzon | G10L 17/22 |

* cited by examiner

FUNCTIONALITY MANAGEMENT FOR DEVICES

BACKGROUND

User devices generally have many functionalities. In some instances, multiple devices having the same or similar functionalities may be situated in the same environment. These functionalities utilize computational resources, and it may be advantageous to save computational resources when possible. Described herein are improvements in technology and solutions to technical problems that can be used to, among other things, save computational resources while maintaining device operability.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
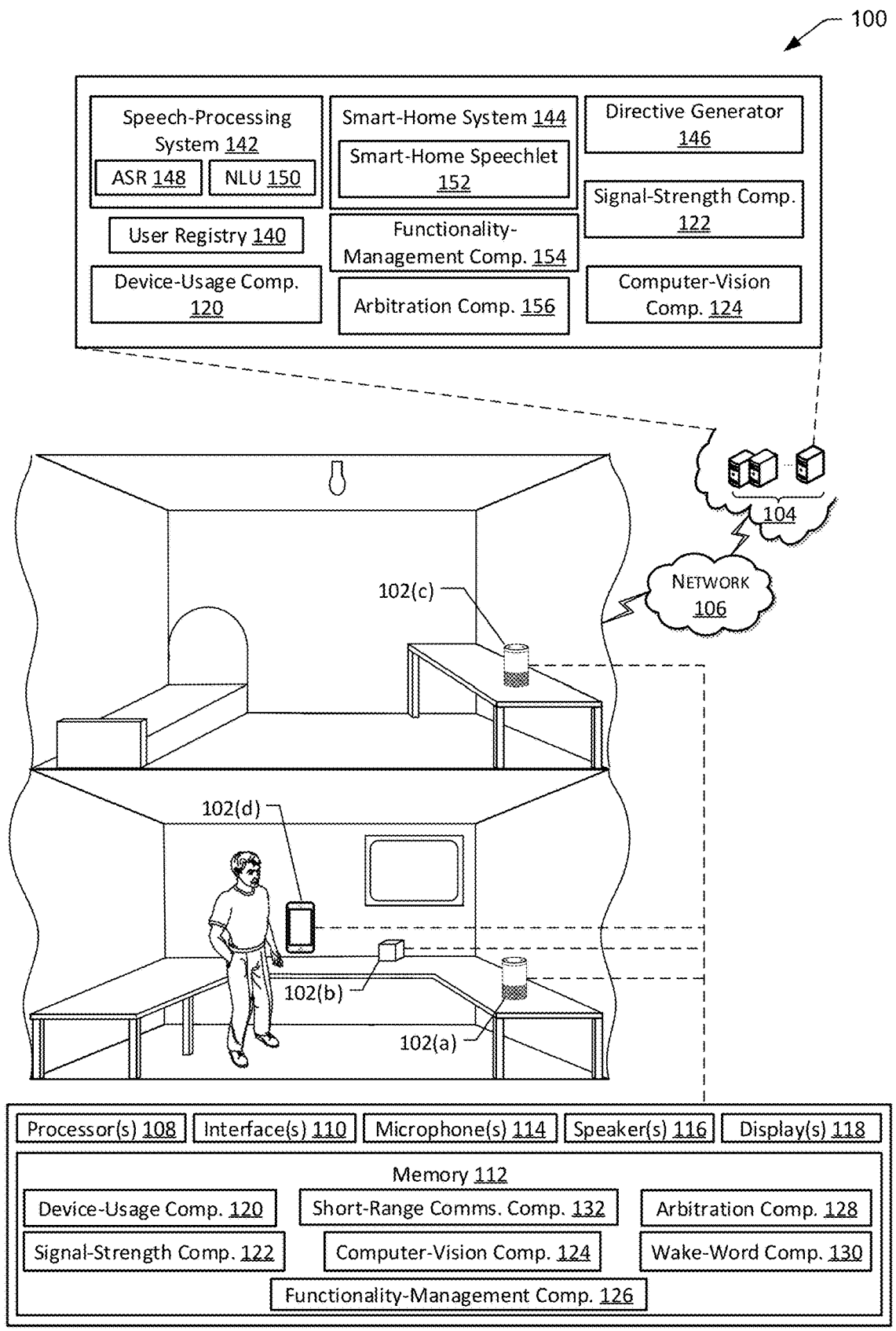
FIG. 1 illustrates a schematic diagram of an example environment for functionality management for devices.

Systems and methods for functionality management for devices are disclosed. Take, for example, an environment, such as a home, that includes one or more computing devices. The computing devices may be, for example, voice-enabled devices such as voice-enabled personal assistant devices, hub devices, personal devices such as mobile phones, and/or one or more other devices capable of sending and receiving data from one or more other devices. Using voice-enabled devices as an example, multiple voice-enabled devices may be situated in the environment and may be utilized to, for example, perform actions in response to user requests. For example, a user may speak a user utterance such as "turn on bedroom light," and microphones of the voice-enabled device may capture audio corresponding to the user utterance and may generate corresponding audio data. Each voice-enabled device may include a wake-word component configured to cause a processor, such as a digital-signal processor, to analyze the audio data to detect a "wake word," which may also be described as a trigger expression. To detect a wake word from the audio data, the digital-signal processor may frequently sample audio data from the microphones, such as every 15 milliseconds for example, and attempt to determine whether the digital signature of the sampled audio data corresponds to a predefined digital signature for the wake word. In these examples, computing resources are utilized frequently to perform the functionality of wake-word detection. One or more functionalities other than wake-word detection may also be performed by the voice-enabled devices, such as short-range communications and/or detection and communication with one or more devices using protocols such as, for example, Bluetooth and/or ZigBee. These other functionalities may run frequently, such as periodically and/or continuously and as such also utilize computing resources.

In examples where multiple devices are situated in the same environment and where those devices include at least one of the same or a similar functionality, the operation of the functionality on all of the devices may be redundant and/or may not be necessary to maintain a desired user experience. Using wake-word detection as an example functionality, two or more voice-enabled devices may be situated in the same environment. The voice-enabled devices may be configured to communicate with each other such as by a local area network. Based at least in part on the voice-enabled devices being in communication with each other, capability data may be exchanged between the devices. In other examples, the capability data may be sent from the voice-enabled devices to a remote system. The capability data may indicate one or more functionalities associated with each voice-enabled device. For example, a first voice-enabled device may include functionalities such as wake-word detection, short-range communication, and echo cancellation. A second voice-enabled device may include functionalities such as wake-word detection and short-range-communication, but not echo cancellation. In this example, the first and second voice-enabled devices may have common functionalities including wake-word detection and short-range communication. Based at least in part on identifying the common functionalities, one of the devices may be identified as a primary device to perform the functionality while the other device may be identified as a secondary device with the functionality disabled.

Identifying a device as a primary device may be based at least in part on one or more factors. Using wake-word detection as an example functionality, identifying a device as a primary device may be based at least in part on an audio-signal strength received at each device. For example, audio may be captured by microphones of each voice-enabled device, and the audio captured by the microphones of the first voice-enabled device may have a first signal strength while the audio captured by the microphones of the second voice-enabled device may have a second signal strength that is less than the first signal strength. In this example, the differing signal strengths may indicate that a user is closer to the first voice-enabled device than the second voice-enabled device. Based at least in part on this determination, the first voice-enabled device may be identified as the primary device and the second voice-enabled device may be identified as the secondary device.

Additionally, or alternatively, usage data may be utilized to determine which device should be the primary device for a given functionality. For example, the usage data may indicate one or more of prior usage patterns of the devices, energy consumption of the devices, wake-word detection false-positive rates, device placement within an environment, device modality, and/or user preference data. Some or all of this data may be analyzed to determine which device to identify as the primary device for a given functionality. For example, prior usage patterns may indicate that the first voice-enabled device is utilized more frequently than the second voice-enabled device. Prior usage patterns may also take into consideration timing data indicating that a device is utilized more frequently during a given time and/or day than another device, but the other device is utilized more frequently during a different time and/or on a different day. The device identified as the device used more frequently for a given time may be identified as the primary device.

Additionally, or alternatively, energy consumption data may indicate that, for example, the first device uses less energy than the second device. In this example, the device that utilizes less power may be identified as the primary device while other devices may be identified as secondary devices. By way of example, a first device may consume a first amount of energy over a given period of time, such as, for example, a day. A second device may consume a second amount of energy over the period of time. Based on one or more factors such as hardware utilized by the devices and/or software differences, the first device may utilize less energy than the second device. In these examples, the first device may be identified as the primary device.

By way of further example, the energy consumption data may indicate that the first device is configured to obtain power from a power outlet, or otherwise operates after being plugged in to a power source associated with the environment. The second device, to the contrary, may be configured to obtain power from a battery. In these examples, the device that receives power from an outlet may be identified as the primary device and devices that obtain power from batteries may be identified as secondary devices.

Additionally, or alternatively, device usage data may be utilized to determine which device should be identified as the primary device and which device(s) should be identified as secondary devices. For example, one device may be utilized more frequently than other devices, such as for a given functionality and/or generally. In these examples, the device used most frequently may be identified as the primary device while the other devices may be identified as the secondary devices.

Additionally, or alternatively, wake-word detection false-positive rates may be utilized to determine which device should be identified as the primary device for the wake-word detection functionality. For example, the first device may have a false-positive rate of 5% while the second device may have a false-positive rate of 15%. Variances in false-positive rates may be based, for example, on the placement of devices within an environment in relation to other items in the environment and/or microphone array configuration. In these examples, the first device may be identified as the primary device for the wake-word detection functionality based at least in part on the first device having a more favorable false-positive rate than the second device. Additionally, or alternatively, device placement may be utilized to determine which device to identify as the primary device. For example, a determination may be made that the first device is in a location that is central to the environment, which may be based at least in part on data sent and received from one or more accessory devices situated in the environment and/or based on beamforming results, for example. In these examples, the device that is more centrally located than other devices may be identified as the primary device, while the other devices may be identified as secondary devices.

Additionally, or alternatively, device modality may be utilized to determine which device to identify as the primary device. For example, device modalities may include the capability to send and receive audio data, image data, or both. For given functionalities, certain device modalities may be useful for performing such functionalities. By way of example, a device functionality may include the ability to detect the presence of movement based at least in part on analysis of image data generated by a camera of a device. In these examples, a device with a modality that includes the capability to send and/or receive image data may be identified as the primary device, while devices without the capability to send and/or receive image data may be identified as secondary devices. Additionally, or alternatively, user preference data may be utilized to identify primary and secondary devices. For example, during setup of a device and/or at some point after setup, the user may provide input indicating that a certain device is to be identified as a primary device, such as for given functionalities. In these examples, the user preference data may be utilized to identify a device as a primary device.

Based at least in part on identifying a device as a primary device, an instruction may be generated and sent to one or more of the secondary devices that causes the functionality to be disabled on the secondary devices. Using wake-word detection functionality as an example, the instruction may cause a digital-signal processor associated with each secondary device to cease processing audio data received by microphones of the secondary devices and/or may cease attempting to detect a wake word from the audio data. By way of further example, for a short-range communication functionality, the instruction may cause a short-range communication component to be disabled such that the device ceases checking for the presence of devices to communicate with and/or ceases receiving data indicating that such devices are present. In examples, the instruction may be generated and sent by the primary device and/or by a remote system associated with the devices. In other examples, the instruction may be generated by the secondary device itself.

The primary device may be maintained as the primary device until, for example, a triggering event occurs. The triggering event may include, for example, the passage of a predetermined amount of time, detection of a change in the environment in which the devices are situated, such as the movement of a user within the environment, the detection of a new device in the environment, the removal of a device from the environment, and/or a change in time from a predefined first time period to a second predefined time period. The triggering event may also include receiving an instruction from the remote system and/or one or more other devices to cease operating as the primary device.

Additionally, or alternatively, while a device is identified as the primary device and the other devices are identified as secondary devices with a certain functionality disabled, input data representing a request for one of the devices to perform an action may be received at a remote system associated with the devices. In these examples, the remote system may analyze the input data to determine which of the devices is to perform the action. Generally, in instances where the input data is received from the primary device, the remote system may determine that the user intends for the action to be performed by that device. However, when functionality management is performed as disclosed herein, particularly when such operations result in wake-word functionality being disabled on secondary devices, the remote system may receive the input data from the primary device based at least in part on the primary device being the only device configured to detect a wake word and transmit audio data to the remote system. In these and other examples, the remote system may identify, determine, and/or receive an indication that a primary device and one or more secondary devices have been identified, and based at least in part on this indication, the remote system may perform device-arbitration operations to determine whether the primary device and/or one or more of the secondary devices should perform the action. In other examples, the device-arbitration operations may be performed by the primary device and/or one or more of the second devices.

For example, a first voice-enabled device may be identified as the primary device and a user may speak a user utterance such as "Alexa, play Video A." The first voice-enabled device may detect the wake word, here "Alexa" for example, and transmit audio data representing the user utterance to a remote system. The remote system, instead of instructing the first voice-enabled device to display Video A based on receiving the audio data from the first voice-enabled device, may perform device-arbitration operations to determine whether the first voice-enabled device or one or more other devices in the environment is to display Video A. In instances where a device other than the primary device is identified as the device to perform the action, an instruction may be sent to the other device to perform the action and to enable the functionality that was disabled while the device was a secondary device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for functionality management for devices. The system 100 may include, for example, one or more computing devices 102(a)-(d), which may include voice-enabled devices 102(a)-(c). The voice-enabled devices 102(a)-(c) may be configured to receive user utterances and perform operations in response to such user utterances. In these examples, the voice-enabled devices 102(a)-(c) may be "hands free" such that interactions with the devices are performed through audible requests and responses. Additionally, the computing devices 102(a)-(d) may include a personal device 102(d), such as a mobile phone, which may be associated with the voice-enabled devices 102(a)-(c) and may communicate directly with the voice-enabled devices 102(a)-(c), one or more the accessory devices, and/or a remote system 104.

The accessory devices may be described as "smart" devices, which may have certain computing components and be configured to send and/or receive data from other devices. The accessory devices may be, for example, light bulbs, plugs, locks, televisions, appliances, doorbells, cameras, etc. The accessory devices may be "paired" or otherwise associated with the computing devices 102(a)-(d) and/or a user account. As such, the accessory devices may be configured to send data to and/or receive data from the computing devices 102(a)-(d).

The computing devices 102(a)-(d) and/or the accessory devices may be configured to send data to and/or receive data from the remote system 104, such as via a network 106. In examples, one or more of the components of the system 100 may communicate directly with the remote system 104, via the network 106. In other examples, one or more of the accessory devices may communicate with the computing devices 102(a)-(d), and the computing devices 102(a)-(d) may communicate with the remote system 104. Additionally, as more fully described herein, one of the computing device 102(a)-(d) may be identified as a primary device while the other computing devices 102(a)-(d) may be identified as secondary devices, and in these instances, the primary device may communicate with the remote system 104 while the secondary devices may communicate with the primary device. As used herein, "primary device" may mean a device that has been designated as in control of performing operations associated with a particular functionality while "secondary devices" may mean devices that have not been designated as in control of performing such operations. A primary device may be described as a "hub device" and/or a "master device," while secondary devices may be described as "non-hub devices" and/or "slave devices."

The computing devices 102(a)-(d) may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device and/or the remote system 104. The displays 118 may be configured to present images, such as images corresponding to image data received from another device and/or the remote system 104. The memory 112 may include components such as, for example, a device-usage component 120, a signal-strength component 122, a computer-vision component 124, a functionality-management component 126, an arbitration component 128, a wake-word component 130, and/or a short-range communication component 132. Each of these components of the memory 112 will be described in detail below.

The remote system 104 may include components such as, for example, a user registry 140, a speech-processing system 142, a smart-home system 144, a device-usage component 120, a signal-strength component 122, a computer-vision component 124, a functionality-management component 154, an arbitration component 156, and/or a directive generator 146. The speech-processing system 142 may include an automatic speech recognition (ASR) component 148 and/or a natural language understanding (NLU) component 150. The smart-home system 144 may include a smart-home speechlet 152. Each of the components described herein with respect to the remote system 104 may be associated with their own systems, which collectively may be referred to herein as the remote system 104, and/or some or all of the components may be associated with a single system. The components of the remote system 104 are described in detail below. In examples, some or each of the components of the remote system 104 may include their own processor(s), network interface(s), and/or memory. As such, by way of example, the speech-processing system 142 may include and/or be associated with processor(s), network interface(s), and/or memory. The smart-home system 144 may include and/or be associated with different processor(s), network interface(s), and/or memory, or one or more of these components may utilize some or all of the same processor(s), network interface(s), and/or memory utilized by the speech-processing system 142. These components are described in detail below. Additionally, the operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 140 may be configured to identify, determine, and/or generate associations between users, user accounts, and/or devices. For example, one or more associations between user accounts may be identified, determined, and/or generated by the user registry 140. The user registry 140 may additionally store information indicating one or more applications and/or resources accessible to and/or enabled for a given user account. Additionally, the user registry 140 may include information indicating device identifiers, such as naming identifiers, associated with a given user account, as well as device types associated with the device identifiers. The user registry 140 may also include information indicating user account identifiers, naming indicators of devices associated with user accounts, and/or associations between computing devices 102(a)-(d). The user registry 140 may also include information associated with usage of the computing devices 102(a)-(d) and/or modalities associated with the computing devices 102(a)-(d). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 142 may be configured to receive audio data from one or more of the computing devices 102(a)-(d) and perform speech-processing operations. For example, the ASR component 148 may be configured to generate text data corresponding to the audio data, and the NLU component 150 may be configured to generate intent data corresponding to the audio data. The intent data may indicate a determined intent associated with the user utterance as well as a payload and/or value associated with the intent. For example, for a user utterance of "turn on bedroom light," the NLU component 150 may identify a "turn on" intent and the payload may be "bedroom light." In this example where the intent data indicates an intent to operate a smart home device with the naming indicator of "bedroom light," the speech-processing system 142 may call the smart-home system 144 to effectuate the intent. The smart-home speechlet 152 may receive the intent data and/or other data associated with the user utterance from the speech-processing system 142 and may perform operations to instruct one or more of the computing devices 102(a)-(d) to operate the "bedroom light" smart-home device.

The speechlet(s) described herein may include a speech-enabled web component that may run in the remote system 104. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

The device-usage component 120 may be configured to analyze data associated with the computing devices 102(a)-(d) to determine which device is most favorable for performing a given function that is common among at least two of the devices located in the environment. As used herein, "environment" may mean, for example, the same room, the same building, the same space whether indoor or outdoor, an area whether devices are in communication with each other, and/or a region and/or area associated with a common component, such as a network access point, a wireless router, and/or a hub device. For example, usage data may be utilized by the device-usage component 120 to determine which device should be a primary device for a given functionality. For example, the usage data may indicate one or more of prior usage patterns of the devices 102(a)-(d), energy consumption of the devices 102(a)-(d), wake-word detection false-positive rates, device placement within an environment, device modality, and/or user preference data. Some or all of this data may be analyzed by the device-usage component 120 to determine which device 102(a)-(d) to identify as the primary device for a given functionality. For example, prior usage patterns may indicate that the first voice-enabled device 102(a) is utilized more frequently than the second voice-enabled device 102(b). Prior usage patterns may also take into consideration timing data indicating that a device 102(a)-(d) is utilized more frequently during a given time and/or day than another device 102(a)-(d), but the other device 102(a)-(d) is utilized more frequently during a different time and/or on a different day. The device 102(a)-(d) identified as the more-frequently used device for a given time may be identified as the primary device. Additionally, or alternatively, energy consumption data may indicate that, for example, the first device 102(a) uses less energy than the second device 102(b). In this example, the device 102(a) that utilizes less power may be identified as the primary device while other devices 102(b)-(d) may be identified as secondary devices. By way of further example, the energy consumption data may indicate that the first device 102(a) is configured to obtain power from a power outlet, or otherwise operates after being plugged in to a power source associated with the environment. The second device 102(b), to the contrary, may be configured to obtain power from a battery. In these examples, the device 102(a) that receives power from an outlet may be identified as the primary device and devices 102(b)-(d) that obtain power from batteries may be identified as secondary devices.

Additionally, or alternatively, wake-word detection false-positive rates may be utilized to determine which device 102(a)-(d) should be identified as the primary device for the wake-word detection functionality. For example, the first device 102(a) may have a false-positive rate of 5% while the second device 102(b) may have a false-positive rate of 15%. Variances in false-positive rates may be based, for example, on the placement of devices within an environment in relation to other items in the environment and/or microphone array configuration. In these examples, the first device 102(a) may be identified as the primary device for the wake-word detection functionality based at least in part on the first device 102(a) having a more favorable false-positive rate than the second device. Additionally, or alternatively, device placement may be utilized to determine which device to identify as the primary device. For example, a determination may be made that the first device 102(a) is in a location that is central to the environment, which may be based at least in part on data sent and received from one or more accessory devices situated in the environment and/or based on beamforming results, for example. In these examples, the device 102(a)-(d) that is more centrally located than other devices may be identified as the primary device, while the other devices 102(a)-(d) may be identified as secondary devices.

Additionally, or alternatively, device modality may be utilized to determine which device 102(a)-(d) to identify as the primary device. For example, device modalities may include the capability to send and receive audio data, image data, or both. For given functionalities, certain device modalities may be useful for performing such functionalities. By way of example, a device functionality may include the ability to detect the presence of movement based at least in part on analysis of image data generated by a camera of a device 102(a)-(d). In these examples, a device 102(a)-(d) with a modality that includes the capability to send and/or receive image data may be identified as the primary device, while devices 102(a)-(d) without the capability to send and/or receive image data may be identified as secondary devices. Additionally, or alternatively, user preference data may be utilized to identify primary and secondary devices. For example, during setup of a device 102(a)-(d) and/or at some point after setup, the user may provide input indicating that a certain device 102(a)-(d) is to be identified as a primary device, such as for given functionalities. In these examples, the user preference data may be utilized to identify a device 102(a)-(d) as a primary device.

In addition to using the usage data described herein, determining which device 102(a)-(d) is to be identified as the primary device may be based at least in part on analyses performed by the signal-strength component 122 and/or the computer-vision component 124. For example, using wake-word detection as an example functionality, identifying a device 102(a)-(d) as a primary device may be based at least in part on an audio signal strength received at each device 102(a)-(d). For example, audio may be captured by microphones 114 of each voice-enabled device 102(a)-(c), and the audio captured by the microphones 114 of the first voice-enabled device 102(a) may have a first signal strength while the audio captured by the microphones 114 of the second voice-enabled device 102(b) may have a second signal strength that is less than the first signal strength. In this example, the differing signal strengths may indicate that a user is closer to the first voice-enabled device 102(a) than the second voice-enabled device 102(b). Additionally, or alternatively, the first signal strength may be associated with a first signal-to-noise value and the second signal strength may be associated with a second signal-to-noise value that is less than the first signal-to-noise value. Based at least in part on these determinations, the first voice-enabled device may be identified as the primary device and the second voice-enabled device may be identified as the secondary device.

Additionally, or alternatively, the computer-vision component 124 may be configured to analyze image data received from one or more cameras associated with one or more of the computing devices 102(a)-(d). For example, one or more of the computing devices 102(a)-(d) may include one or more sensors that may detect motion and, in response to detecting motion, may cause a camera to capture images of the environment and generate corresponding image data. In other examples, the cameras may be caused to capture images of the environment periodically and/or based on one or more predefined settings. The computer-vision component 124 may receive the image data and may perform image analysis on the image data to detect the presence of, for example, a person. The analysis may include determining that the image depicts shapes, colors, and/or movement types associated with a person. In examples, the image analysis may include comparing the image data to reference image data that includes a person to determine if the image data depicts a person. In instances where the computer-vision component 124 determines that a person is present in the environment associated with the first device 102(a) but that a person is not present in the environment associated with another device 102(c), this information may be utilized to identify the first device 102(a) as the primary device for a given functionality.

The functionality-management component 154 may be configured to utilize information from the analyses performed by the device-usage component 122 to identify a device 102(a)-(d) as the primary device and other devices 102(a)-(d) as secondary devices. For example, the functionality-management component 154 may be configured to generate data indicating which device 102(a)-(d) is the primary device and which device(s) 102(a)-(d) are the secondary devices. The functionality-management component 154 may also be configured to generate and/or store data indicating that a primary device has been assigned such that device arbitration may be performed when a user request to perform an action is received, as described more fully below.

Additionally, or alternatively, the functionality-management component 154 may be configured to maintain a device 102(a)-(d) as the primary device until, for example, a triggering event occurs. The triggering event may include, for example, the passage of a predetermined amount of time, detection of a change in the environment in which the devices 102(a)-(d) are situated, such as the movement of a user within the environment, the detection of a new device in the environment, the removal of a device 102(a)-(d) from the environment, and/or a change in time from a predefined first time period to a second predefined time period. With respect to the periods of time, it may be determined that functionality management may be performed during a first period of time, such as, for example, from 8:00 am to 5:00 pm on weekdays, while such operations may not be performed during a second period of time, such as, for example, from 5:00 pm to 10:00 pm on weekdays. The periods of time may be established by user input and/or by analysis of device usage patterns indicating when the devices are most frequently used and/or when one person is typically present in the environment. The triggering event may also include receiving an instruction from the remote system 104 and/or one or more other devices to cease operating as the primary device.

Based at least in part on identifying a device as a primary device, an instruction may be generated and sent to one or more of the secondary devices that causes the functionality to be disabled on the secondary devices. Using wake-word detection functionality as an example, the instruction may cause the wake-word component 130 and/or a digital-signal processor associated with each secondary device to cease processing audio data received by microphones 114 of the secondary devices and/or may cease attempting to detect a wake word from the audio data. By way of further example, for a short-range communication functionality, the instruction may cause the short-range communication component 132 to be disabled such that the device 102(*a*)-(*d*) ceases checking for the presence of devices to communicate with and/or ceases receiving data indicating that such devices are present. In examples, the instruction may be generated and sent by the primary device. In other examples, the instruction, which may otherwise be described as a "directive" and/or "directive data" may be generated by the directive generator 146 of the remote system 104. In other examples, the instruction may be generated by the secondary device itself. Additional details on the generation and sending of directives and/or messages between the devices 102(*a*)-(*d*) and/or the remote system 104 are provided below with respect to FIGS. 5 and 6. It should be noted that the functionality-management component 154 of the remote system 104 may be configured to generate and send instructions as described above to the primary device and/or to the one or more secondary devices. The functionality-management component 126 of the device(s) 102(*a*)-(*d*) may be configured to generate and send instructions as described above to other devices and/or to the remote system 104.

The arbitration component 156 may be configured to perform device arbitration to determine which device 102(*a*)-(*d*) to instruct to respond to a user request for performance of an action. For example, while a device 102(*a*)-(*d*) is identified as the primary device and the other devices 102(*a*)-(*d*) are identified as secondary devices with a certain functionality disabled, input data representing a request for one of the devices 102(*a*)-(*d*) to perform an action may be received at the remote system 104 associated with the devices and/or at the primary device. In these examples, the remote system 104 and/or the primary device may analyze the input data to determine which of the devices 102(*a*)-(*d*) is to perform the action. Generally, in instances where the input data is received from the primary device, the remote system 104 and/or the primary device may determine that the user intends for the action to be performed by that device 102(*a*)-(*d*). However, when functionality management is performed as disclosed herein, particularly when such operations result in wake-word functionality being disabled on secondary devices, the remote system 104 and/or the primary device may receive the input data from the primary device based at least in part on the primary device being the only device 102(*a*)-(*d*) configured to detect a wake word and transmit audio data to the remote system 104. In these and other examples, the remote system 104 and/or the primary device may identify, determine, and/or receive an indication that a primary device and one or more secondary devices have been identified, and based at least in part on this indication, the remote system 104 and/or the primary device may perform device-arbitration operations to determine whether the primary device and/or one or more of the secondary devices should perform the action.

For example, a first voice-enabled device 102(*a*) may be identified as the primary device and a user may speak a user utterance such as "Alexa, play Video A." The first voice-enabled device 102(*a*) may detect the wake word, here "Alexa" for example, and transmit audio data representing the user utterance to a remote system 104. The arbitration component 156, instead of instructing the first voice-enabled device 102(*a*) to display Video A based on receiving the audio data from the first voice-enabled device 102(*a*), may perform device arbitration operations to determine whether the first voice-enabled device or one or more other devices in the environment is to display Video A. In instances where a device other than the primary device is identified as the device to perform the action, an instruction may be sent to the other device to perform the action and to enable the functionality that was disabled while the device was a secondary device. Device arbitration is described in more detail below with respect to FIGS. 7A and 7B. It should be noted that the arbitration component 156 of the remote system 104 may be utilized to arbitrate among devices such as when the remote system 104 performs speech-processing operations, while the arbitration component 128 of the device(s) 102(*a*)-(*d*) may be utilized to arbitrate among devices such as when one or more of the devices 102(*a*)-(*d*) performs speech-processing and/or functionality management operations, as described more fully herein.

As shown in FIG. 1, several of the components of the remote system 104 and the associated functionality of those components as described herein may be performed by one or more of the computing devices 102(*a*)-(*d*). Additionally, or alternatively, some or all of the components associated with the memory 112 of one or more of the computing devices 102(*a*)-(*d*) may be performed by the remote system 104.

It should be noted that the exchange of data and/or information as described herein may be performed only in situations where a user has provided consent for the exchange of such information. For example, upon setup of devices and/or initiation of functionality management, a user may be provided with the opportunity to opt in and/or opt out of data exchanges between devices and/or with the remote system and/or for performance of functionality management. Additionally, when one of the computing devices is associated with a first user account and another of the computing devices is associated with a second user account, user consent may be obtained before performing some, any, or all of the operations and/or processes described herein.

As used herein, a processor, such as processor(s) 108 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the remote system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the remote system 104 may possess its own local memory, which also may store program components, program data, and/or one or more operating systems.

The memory 112 and/or the memory described with respect to the components of the remote system 104 may include volatile and nonvolatile memory, removable and non-removable media implemented in any method or technology for storage of information, such as computer-readable instructions, data structures, program component, or other data. Such memory 112 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the remote system 104 may be implemented as computer-readable storage media ("CRSM"), which may be any available physical media accessible by the processor(s) 108 and/or the processor(s) described with respect to the remote system 104 to execute instructions stored on the memory 112 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the remote system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110 and/or the network interface(s) described with respect to the components of the remote system 104 may enable messages between the components and/or devices shown in system 100 and/or with one or more other remote systems, as well as other networked devices. Such network interface(s) 110 and/or the network interface(s) described with respect to the components of the remote system 104 may include one or more network interface controllers (NICs) or other types of transceiver devices to send and receive messages over the network 106.

For instance, each of the network interface(s) 110 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the remote system 104 may include a wide area network (WAN) component to enable message over a wide area network.

In some instances, the remote system 104 may be local to an environment associated the computing devices 102(a)-(d). For instance, the remote system 104 may be located within one or more of the computing devices 102(a)-(d). In some instances, some or all of the functionality of the remote system 104 may be performed by one or more of the computing devices 102(a)-(d). Also, while various components of the remote system 104 have been labeled and named in this disclosure and each component has been described as being configured to cause the processor(s) to perform certain operations, it should be understood that the described operations may be performed by some or all of the components and/or other components not specifically illustrated.

Figure 2:
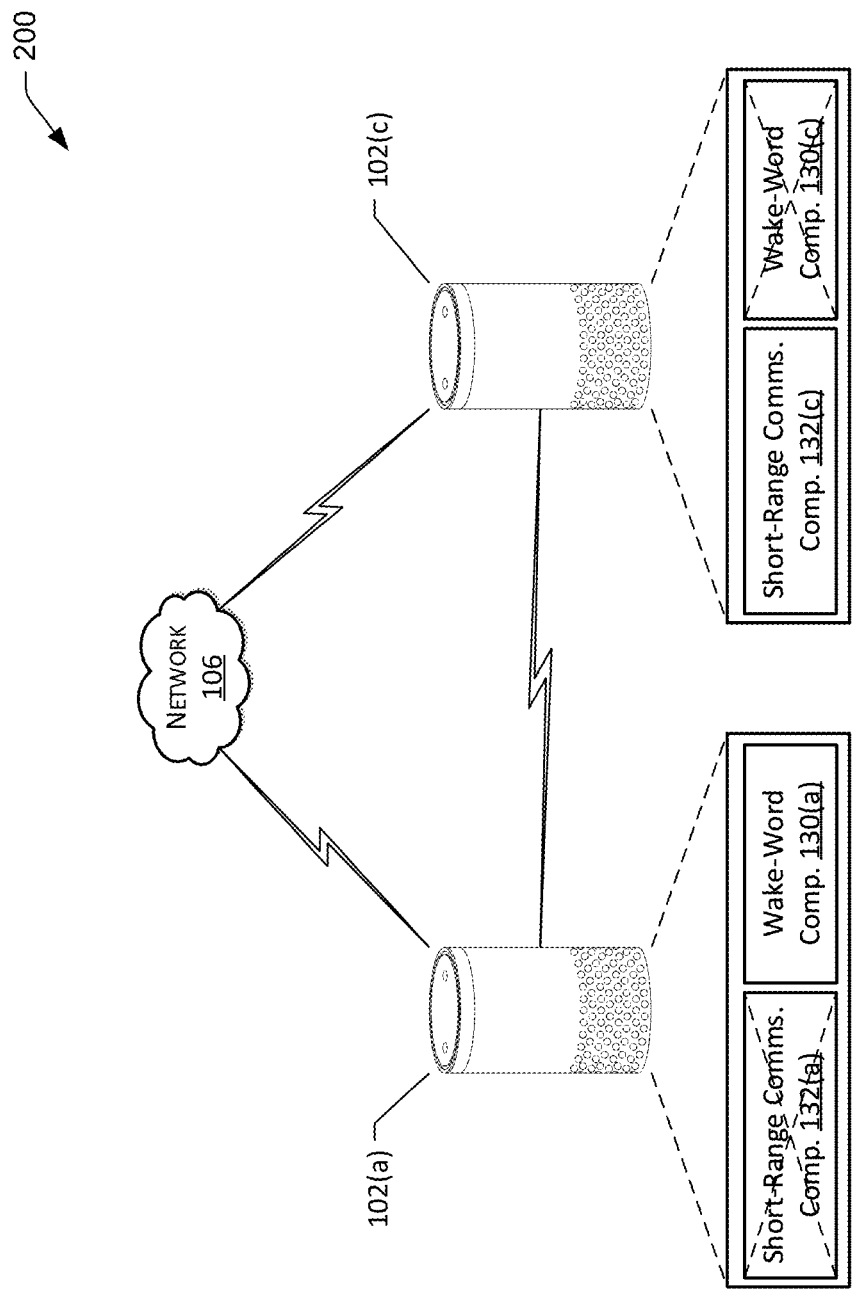
FIG. 2 illustrates a schematic diagram of devices and device components for functionality management.

FIG. 2 illustrates a schematic diagram of devices and device components for functionality management. For example, a system 200 may include a first voice-enabled device 102(a) and a second voice-enabled device 102(c), which may include the same or similar components as the computing devices 102(a)-(d) as described with respect to FIG. 1. For example, the first and second voice-enabled devices 102(a), 102(c) may each include a wake-word component 130(a), 130(c) and a short-range communication component 132(a), 132(c). Additionally, the first and second voice-enabled devices 102(a), 102(c) may be configured to send data to and receive data from each other directly and/or by utilizing a network 106.

As shown in FIG. 2, the first and second voice-enabled devices 102(a), 102(c) have at least two common functionalities, namely, the wake-word component 130(a), 130(c) and the short-range communication component 132(a), 132(c). In these examples, a primary device may be selected for one or more than one of the common functionalities. For example, the voice-enabled devices 102(a), 102(c) may be configured to communicate with each other such as by a local area network. Based at least in part on the voice-enabled devices 102(a), 102(c) being in communication with each other, capability data may be exchanged between the devices. In other examples, the capability data may be sent from the voice-enabled devices 102(a), 102(c) to a remote system. The capability data may indicate one or more functionalities associated with each voice-enabled device 102(a), 102(c). As shown in FIG. 2, the voice-enabled devices 102(a), 102(c) include functionalities such as wake-word detection and short-range communication. Based at least in part on identifying the common functionalities, one of the devices 102(a), 102(c) may be identified as a primary device to perform the functionality while the other device 102(a), 102(c) may be identified as a secondary device with the functionality disabled.

Identifying a device as a primary device may be based at least in part on one or more factors. Using wake-word detection as an example functionality, identifying a device as a primary device may be based at least in part on an audio signal strength received at each device. For example, audio may be captured by microphones of each voice-enabled device, and the audio captured by the microphones of the first voice-enabled device 102(a) may have a first signal strength while the audio captured by the microphones of the second voice-enabled device 102(c) may have a second signal strength that is less than the first signal strength. In this example, the differing signal strengths may indicate that a user is closer to the first voice-enabled device 102(a) than the second voice-enabled device 102(c). Based at least in part on this determination, the first voice-enabled device 102(a) may be identified as the primary device and the second voice-enabled device 102(c) may be identified as the secondary device.

Additionally, or alternatively, usage data may be utilized to determine which device should be the primary device for a given functionality. For example, the usage data may indicate one or more of prior usage patterns of the devices, energy consumption of the devices, wake-word detection false-positive rates, device placement within an environment, device modality, and/or user preference data. Some or all of this data may be analyzed to determine which device to identify as the primary device for a given functionality.

Based at least in part on identifying a device 102(a), 102(c) as a primary device, an instruction may be generated and sent to one or more of the secondary devices that causes the functionality to be disabled on the secondary devices. Using wake-word detection functionality as an example, the instruction may cause a digital-signal processor associated with each secondary device to cease processing audio data received by microphones of the secondary devices and/or may cease attempting to detect a wake word from the audio data. By way of further example, for a short-range communication functionality, the instruction may cause a short-range communication component to be disabled such that the device ceases checking for the presence of devices to communicate with and/or ceases receiving data indicating that such devices are present. In examples, the instruction may be generated and sent by the primary device and/or by a remote system associated with the devices. In other examples, the instruction may be generated by the secondary device itself.

As shown with respect to FIG. 2, each device may be identified as a primary device for a given functionality. For example, the first voice-enabled device 102(a) may be identified as the primary device with respect to the wake-word component 130(a). In this example, the wake-word component 130(a) of the first voice-enabled device 102(a) may remain enabled while the wake-word component 130(c) of the second voice-enabled device 102(c) may be disabled. By way of further example, the second voice-enabled device 102(c) may be identified as the primary device with respect to the short-range communication component 132(c). In this example, the short-range communication component 132(c) of the second voice-enabled device 102(c) may remain enabled while the short-range communication component 132(a) of the first voice-enabled device 102(a) may be disabled.

The primary device may be maintained as the primary device until, for example, a triggering event occurs. The triggering event may include, for example, the passage of a predetermined amount of time, detection of a change in the environment in which the devices are situated, such as the movement of a user within the environment, the detection of a new device in the environment, the removal of a device from the environment, and/or a change in time from a predefined first time period to a second predefined time period. The triggering event may also include receiving an instruction from the remote system and/or one or more other devices to cease operating as the primary device.

It should be understood that while short-range communication components are described herein as being enabled and/or disabled, such operations may include partially or fully enabling and/or disabling such components and/or may include ceasing and/or resuming performing operations associated with short-range communication components. For example, a Bluetooth component and/or associated functionality may be disabled and/or caused to cease performing operations when a device is determined to be a secondary device, while other components and/or functionality associated with the short-range communication component, such as wireless communication functionality and/or components, may not be disabled.

Figure 3:
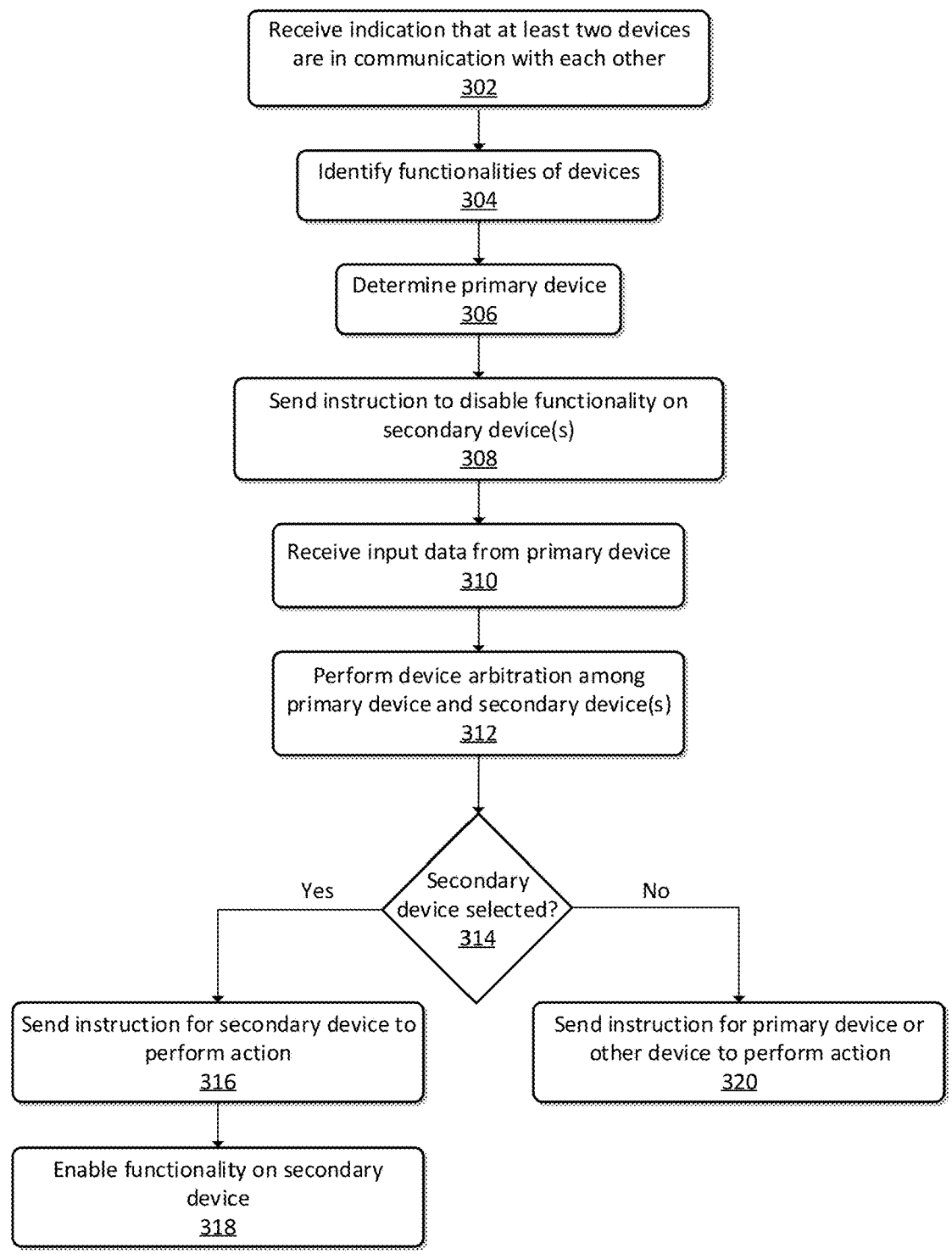
FIG. 3 illustrates a flow diagram of an example process for functionality management for devices.
Figure 4:
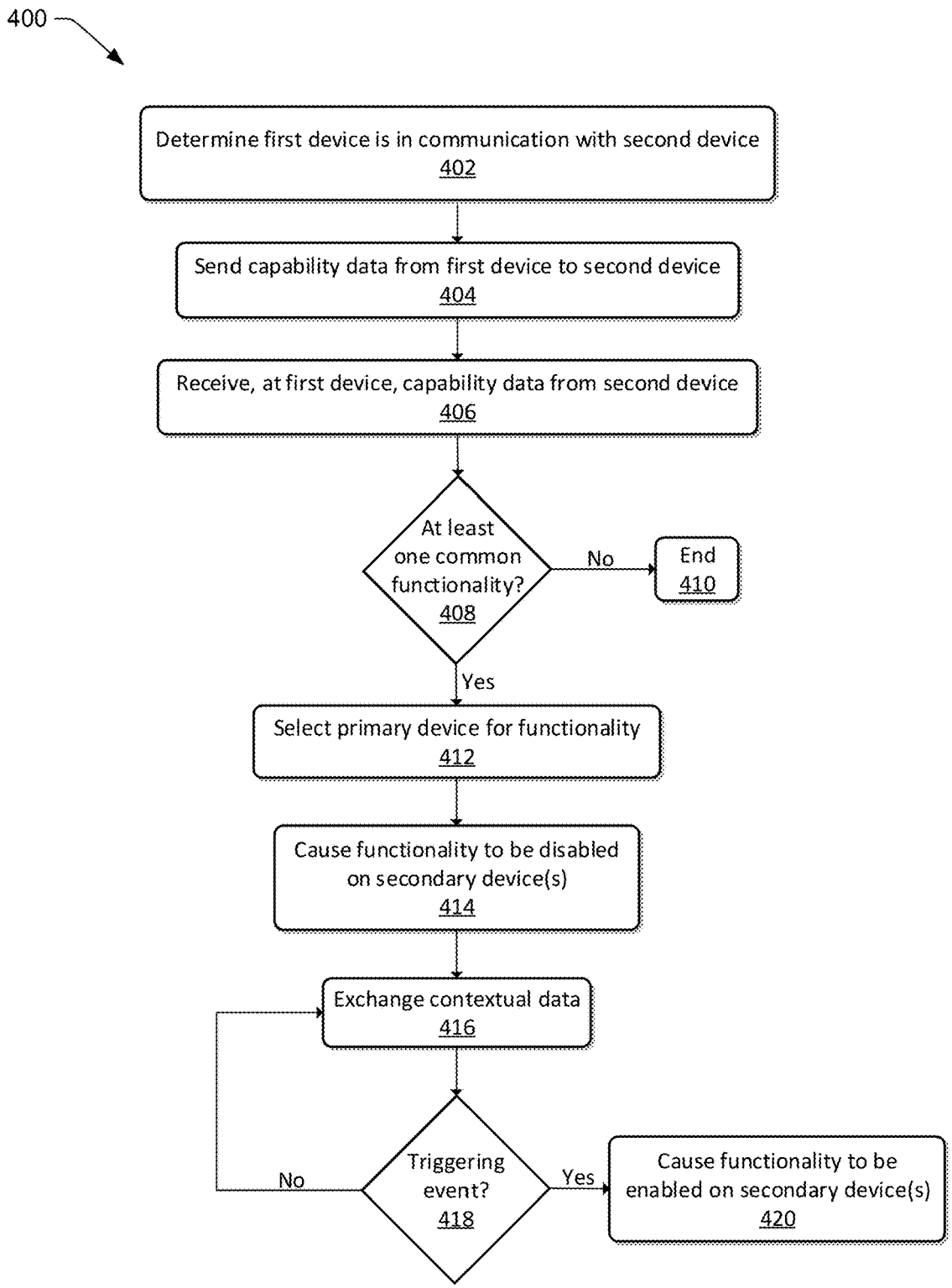
FIG. 4 illustrates a flow diagram of another example process for functionality management for devices.

FIGS. 3 and 4 illustrate processes for functionality management for devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, 5-7B, and 10-12, although the processes may be implemented in a wide variety of other environments, architectures and systems.

FIG. 3 illustrates a flow diagram of an example process 300 for functionality management for devices. FIG. 3 illustrates the example process 300 from the perspective of a remote system, such as the remote system 104 described with respect to FIG. 1. The order in which the operations or steps are described is not intended to be construed as a limitation, and any number of the described operations may be combined in any order and/or in parallel to implement process 300.

At block 302, the process 300 may include receiving an indication that at least two devices are in communication with each other. The indication may be received from one or more of the devices and/or the indication may be generated by a remote system associated with the devices. For example, the devices, which may be computing devices such as the computing devices 102(a)-(d) described with respect to FIG. 1, may be configured to communicate with each other over a short-range communication platform and/or utilizing one or more short-range communication protocols. The devices may be configured to send and/or receive signals and/or beacons indicating that the devices are present. The devices, upon receiving signals and/or beacons from each other, may establish a communication channel and/or may be identified as being in communication with each other. In other examples, the devices may be equipped with geolocation components configured to identify the geolocation associated with the devices. Devices with geolocations within a threshold proximity to each other may be in communication with each other. Additionally, or alternatively, the devices may be configured to communicate over a wireless network. When the devices are associated with the same wireless access point, they may be determined to be in communication with each other.

At block 304, the process 300 may include identifying one or more functionalities associated with the devices. For example, capability data may be sent from the devices to a remote system. The capability data may indicate one or more functionalities associated with each device. For example, a first device may include functionalities such as wake-word detection, short-range communication, and echo cancellation. A second device may include functionalities such as wake-word detection and short-range-communication, but not echo cancellation. In this example, the first and second devices may have common functionalities including wake-word detection and short-range communication. In other examples, the devices may exchange the capability data among the devices and one or more of the devices may communicate the common functionalities to the remote system. In other examples, the devices may be associated with a user account associated with the remote system. The user account may store data indicating the functionalities of the devices, which may be based at least in part on the device identifiers of the devices and/or the device types and/or device specifications known to the remote system.

At block 306, the process 300 may include determining and/or identifying a primary device of the at least two devices. For example, a device-usage component may be configured to analyze data associated with the devices to determine which device is most favorable for performing a given function that is common among at least two of the devices. For example, usage data may be utilized by the device-usage component to determine which device should be a primary device for a given functionality. For example, the usage data may indicate one or more of prior usage patterns of the devices, energy consumption of the devices, wake-word detection false-positive rates, device placement within an environment, device modality, and/or user preference data. Some or all of this data may be analyzed by the device-usage component to determine which device to identify as the primary device for a given functionality. For example, prior usage patterns may indicate that the first device is utilized more frequently than the second device. Prior usage patterns may also take into consideration timing data indicating that a device is utilized more frequently during a given time and/or day than another device, but the other device is utilized more frequently during a different time and/or on a different day. The device identified as the more-frequently used device for a given time may be identified as the primary device. Additionally, or alternatively, energy consumption data may indicate that, for example, the first device uses less energy than the second device. In this example, the device that utilizes less power may be identified as the primary device while other devices may be identified as secondary devices. By way of further example, the energy consumption data may indicate that the first device is configured to obtain power from a power outlet, or otherwise operates after being plugged in to a power source associated with the environment. The second device, to the contrary, may be configured to obtain power from a battery. In these examples, the device that receives power from an outlet may be identified as the primary device and devices that obtain power from batteries may be identified as secondary devices.

Additionally, or alternatively, wake-word detection false-positive rates may be utilized to determine which device should be identified as the primary device for the wake-word detection functionality. For example, the first device may have a false-positive rate of 1% while the second device may have a false-positive rate of 2%. In these examples, the first device may be identified as the primary device for the wake-word detection functionality based at least in part on the first device having a more favorable false-positive rate than the second device. Additionally, or alternatively, device placement may be utilized to determine which device to identify as the primary device. For example, a determination may be made that the first device is in a location that is central to the environment, which may be based at least in part on data sent and received from one or more accessory devices situated in the environment and/or based on beam-forming results, for example. In these examples, the device that is more centrally located than other devices may be identified as the primary device, while the other devices may be identified as secondary devices.

Additionally, or alternatively, device modality may be utilized to determine which device to identify as the primary device. For example, device modalities may include the capability to send and receive audio data, image data, or both. For given functionalities, certain device modalities may be useful for performing such functionalities. By way of example, a device functionality may include the ability to detect the presence of movement based at least in part on analysis of image data generated by a camera of a device. In these examples, a device with a modality that includes the capability to send and/or receive image data may be identified as the primary device, while devices without the capability to send and/or receive image data may be identified as secondary devices. Additionally, or alternatively, user preference data may be utilized to identify primary and secondary devices. For example, during setup of a device and/or at some point after setup, the user may provide input indicating that a certain device is to be identified as a primary device, such as for given functionalities. In these examples, the user preference data may be utilized to identify a device as a primary device.

In addition to using the usage data described herein, determining which device is to be identified as the primary device may be based at least in part on analyses performed by a signal-strength component and/or a computer-vision component. For example, using wake-word detection as an example functionality, identifying a device as a primary device may be based at least in part on an audio signal strength received at each device. For example, audio may be captured by microphones of each device, and the audio captured by the microphones of the first device may have a first signal strength while the audio captured by the microphones of the second device may have a second signal strength that is less than the first signal strength. In this example, the differing signal strengths may indicate that a user is closer to the first device than the second device. Additionally, or alternatively, the first signal strength may be associated with a first signal-to-noise value and the second signal strength may be associated with a second signal-tonoise value that is less than the first signal-to-noise value. Based at least in part on these determinations, the first voice-enabled device may be identified as the primary device and the second voice-enabled device may be identified as the secondary device.

Additionally, or alternatively, the computer-vision component may be configured to analyze image data received from one or more cameras associated with one or more of the devices. For example, one or more of the devices may include one or more sensors that may detect motion and, in response to detecting motion, may cause a camera to capture images of the environment and generate corresponding image data. In other examples, the cameras may be caused to capture images of the environment periodically and/or based on one or more predefined settings. The computer-vision component may receive the image data and may perform image analysis on the image data to detect the presence of, for example, a person. The analysis may include determining that the image depicts shapes, colors, and/or movement types associated with a person. In examples, the image analysis may include comparing the image data to reference image data that includes a person to determine if the image data depicts a person. In instances where the computer-vision component determines that a person is present in the environment associated with the first device but that a person is not present in the environment associated with another device, this information may be utilized to identify the first device as the primary device for a given functionality.

At block 308, the process 300 may include sending an instruction to disable at least one functionality on the secondary device(s). For example, based at least in part on identifying a device as a primary device, an instruction may be generated and sent to one or more of the secondary devices that causes the functionality to be disabled on the secondary devices. Using wake-word detection functionality as an example, the instruction may cause the wake-word component and/or a digital-signal processor associated with each secondary device to cease processing audio data received by microphones of the secondary devices and/or may cease attempting to detect a wake word from the audio data. By way of further example, for a short-range communication functionality, the instruction may cause the short-range communication component to be disabled such that the device ceases checking for the presence of devices to communicate with and/or ceases receiving data indicating that such devices are present. In examples, the instruction may be generated and sent by the primary device. In other examples, the instruction, which may otherwise be described as a "directive" and/or "directive data" may be generated by a directive generator of the remote system. In other examples, the instruction may be generated by the secondary device itself. Additional details on the generation and sending of directives and/or messages between the devices and/or the remote system are provided below with respect to FIGS. 5 and 6.

At block 310, the process 300 may include receiving input data from the primary device. The input data may comprise audio data, which may correspond to audio representing a user utterance spoken by a user and captured by microphones of the primary device. The primary device may generate the audio data and send the audio data to the remote system. In other examples, the input data may correspond to user input to a personal device. For example, the personal device may have stored thereon and/or access to an application associated with the devices. The application may include a graphical user interface that may be utilized to display information and/or to receive inputs from the user. The user may, for example, select a portion of a screen associated with the application. The personal device may generate corresponding input data and send the input data to the remote system.4

At block 312, the process 300 may include performing device arbitration among the primary device and one or more of the secondary devices. For example, an arbitration component may be configured to perform device arbitration to determine which device to instruct to respond to the input data for performance of an action. For example, while a device is identified as the primary device and the other devices are identified as secondary devices with a certain functionality disabled, input data representing a request for one of the devices to perform an action may be received at the remote system associated with the devices and/or at the primary device. In these examples, the remote system and/or the primary device may analyze the input data to determine which of the devices is to perform the action. Generally, in instances where the input data is received from the primary device, the remote system and/or the primary device may determine that the user intends for the action to be performed by that device. However, when functionality management is performed as disclosed herein, particularly when such operations result in wake-word functionality being disabled on secondary devices, the remote system and/or the primary device may receive the input data from the primary device based at least in part on the primary device being the only device configured to detect a wake word and transmit audio data to the remote system. In these and other examples, the remote system and/or the primary device may identify, determine, and/or receive an indication that a primary device and one or more secondary devices have been identified, and based at least in part on this indication, the remote system and/or the primary device may perform device-arbitration operations to determine whether the primary device and/or one or more of the secondary devices should perform the action.

For example, a first device may be identified as the primary device and a user may speak a user utterance such as "Alexa, play Video A." The first device may detect the wake word, here "Alexa" for example, and transmit audio data representing the user utterance to a remote system. The arbitration component, instead of instructing the first device to display Video A based on receiving the audio data from the first device, may perform device-arbitration operations to determine whether the first device or one or more other devices in the environment is to display Video A.

At block 314, the process 300 may include determining whether the secondary device is identified as the device to perform an action in response to the input data. For example, the device-arbitration operations as described herein may be utilized to determine that one of the secondary devices is selected as the device to respond to the input data. In other examples, the device-arbitration operations as described herein may be utilized to determine that the primary device is selected as the device to respond to the input data.

If the secondary device is identified as the device to perform the action, then at block 316 the process 300 may include sending an instruction for the secondary device to perform the action. For example, directive data may be generated and sent to the secondary device to perform the action. Alternatively, the directive data may be sent to the primary device, which may send the directive data to the secondary device. The directive data may represent an instruction to perform an action, such causing display of images, causing output of audio, causing operations of accessory devices, causing scheduling of an event, etc.

At block 318, the process 300 may include enabling the functionality that had been disabled on the secondary device. For example, the directive data described with respect to block 316 may include an instruction to enable the functionality that had been disabled on the secondary device. In other examples, a separate instruction may be sent by the remote system and/or the primary device to the secondary device to enable the functionality. In other examples, upon receiving the directive data, the secondary device may instruct itself to enable the functionality.

Returning to block 314, if the secondary device is not identified as the device to perform the action, such as when the primary device is identified and/or another device is identified as the device to perform the action, then at block 320, an instruction may be sent for the primary device to perform the action. The instruction may be sent and/or received in the same or a similar manner as described above with respect to blocks 316 and 318.

Additionally, or alternatively, the process 300 may include sending data, such as usage data, to one or more of the secondary devices during times when those devices are identified as secondary devices or otherwise. For example, the primary device and/or the remote system may continue to send historical usage data to one or more of the secondary devices such that those secondary devices are up to date and/or have access to relevant data when those devices are transitioned to primary devices. In other examples, upon determining and/or receiving an indication that a secondary device has been transitioned to a primary device, the historical usage data may be sent from the primary device and/or the remote system to the secondary device(s).

FIG. 4 illustrates a flow diagram of another example process 400 for functionality management for devices. FIG. 4 illustrates the example process 400 from the perspective of a computing device, such as the computing devices 102(a)-(d) described with respect to FIG. 1. The order in which the operations or steps are described is not intended to be construed as a limitation, and any number of the described operations may be combined in any order and/or in parallel to implement process 400.

At block 402, the process 400 may include determining that a first device is in communication with a second device. For example, the devices, which may be computing devices such as the computing devices 102(a)-(d) described with respect to FIG. 1, may be configured to communicate with each other over a short-range communication platform and/or utilizing one or more short-range communication protocols. The devices may be configured to send and/or receive signals and/or beacons indicating that the devices are present. The devices, upon receiving signals and/or beacons from each other, may establish a communication channel and/or may be identified as being in communication with each other. In other examples, the devices may be equipped with geolocation components configured to identify the geolocation associated with the devices. Devices with geolocations within a threshold proximity to each other may be in communication with each other. Additionally, or alternatively, the devices may be configured to communicate over a wireless network. When the devices are associated with the same wireless access point, they may be determined to be in communication with each other.

At block 404, the process 400 may include sending capability data from the first device to the second device. The capability data may indicate one or more functionalities associated with each device. For example, the first device may include functionalities such as wake-word detection, short-range communication, and echo cancellation. A second device may include functionalities such as wake-word detection and short-range-communication, but not echo cancellation.

At block 406, the process 400 may include receiving, at the first device, capability data from the second device. The capability data may be the same or similar to the capability data described with respect to block 404, above. The capability data may be sent from the second device to the first device in the same or a similar manner as described with respect to block 404.

At block 408, the process 400 may include determining whether the first device and the second device have at least one common functionality. In the example used above, the first and second devices may have common functionalities including wake-word detection and short-range communication. In other examples, the devices may exchange the capability data among the devices and one or more of the devices may communicate the common functionalities to the remote system. In other examples, the devices may be associated with a user account associated with a remote system. The user account may store data indicating the functionalities of the devices, which may be based at least in part on the device identifiers of the devices and/or the device types and/or device specifications known to the remote system.

If the first device and the second device do not have a common functionality, then at block 410 the process 400 may end and the functionalities of the first device may be maintained and the functionalities of the second device may be maintained. In these examples, neither the first device nor the second device may be identified as a primary device or a secondary device.

If the first device and the second device do have a common functionality, then at block 412, the process 400 may include selecting and/or identifying the first device or the second device as a primary device for at least one of the common functionalities. For example, a device-usage component may be configured to analyze data associated with the devices to determine which device is most favorable for performing a given function that is common among at least two of the devices. For example, usage data may be utilized by the device-usage component to determine which device should be a primary device for a given functionality. For example, the usage data may indicate one or more of prior usage patterns of the devices, energy consumption of the devices, wake-word detection false-positive rates, device placement within an environment, device modality, and/or user preference data. Some or all of this data may be analyzed by the device-usage component to determine which device to identify as the primary device for a given functionality. For example, prior usage patterns may indicate that the first device is utilized more frequently than the second device. Prior usage patterns may also take into consideration timing data indicating that a device is utilized more frequently during a given time and/or day than another device, but the other device is utilized more frequently during a different time and/or on a different day. The device identified as the more-frequently used device for a given time may be identified as the primary device. Additionally, or alternatively, energy consumption data may indicate that, for example, the first device uses less energy than the second device. In this example, the device that utilizes less power may be identified as the primary device while other devices may be identified as secondary devices. By way of further example, the energy consumption data may indicate that the first device is configured to obtain power from a power outlet, or otherwise operates after being plugged in to a power source associated with the environment. The second device, to the contrary, may be configured to obtain power from a battery. In these examples, the device that receives power from an outlet may be identified as the primary device and devices that obtain power from batteries may be identified as secondary devices.

Additionally, or alternatively, wake-word detection false-positive rates may be utilized to determine which device should be identified as the primary device for the wake-word detection functionality. For example, the first device may have a false-positive rate of 1% while the second device may have a false-positive rate of 2%. In these examples, the first device may be identified as the primary device for the wake-word detection functionality based at least in part on the first device having a more favorable false-positive rate than the second device. Additionally, or alternatively, device placement may be utilized to determine which device to identify as the primary device. For example, a determination may be made that the first device is in a location that is central to the environment, which may be based at least in part on data sent and received from one or more accessory devices situated in the environment and/or based on beam-forming results, for example. In these examples, the device that is more centrally located than other devices may be identified as the primary device, while the other devices may be identified as secondary devices.

Additionally, or alternatively, device modality may be utilized to determine which device to identify as the primary device. For example, device modalities may include the capability to send and receive audio data, image data, or both. For given functionalities, certain device modalities may be useful for performing such functionalities. By way of example, a device functionality may include the ability to detect the presence of movement based at least in part on analysis of image data generated by a camera of a device. In these examples, a device with a modality that includes the capability to send and/or receive image data may be identified as the primary device, while devices without the capability to send and/or receive image data may be identified as secondary devices. Additionally, or alternatively, user preference data may be utilized to identify primary and secondary devices. For example, during setup of a device and/or at some point after setup, the user may provide input indicating that a certain device is to be identified as a primary device, such as for given functionalities. In these examples, the user preference data may be utilized to identify a device as a primary device.

In addition to using the usage data described herein, determining which device is to be identified as the primary device may be based at least in part on analyses performed by a signal-strength component and/or a computer-vision component. For example, using wake-word detection as an example functionality, identifying a device as a primary device may be based at least in part on an audio signal strength received at each device. For example, audio may be captured by microphones of each device, and the audio captured by the microphones of the first device may have a first signal strength while the audio captured by the microphones of the second device may have a second signal strength that is less than the first signal strength. In this example, the differing signal strengths may indicate that a user is closer to the first device than the second device. Additionally, or alternatively, the first signal strength may be associated with a first signal-to-noise value and the second signal strength may be associated with a second signal-to-noise value that is less than the first signal-to-noise value. Based at least in part on these determinations, the first voice-enabled device may be identified as the primary device and the second voice-enabled device may be identified as the secondary device.

Additionally, or alternatively, the computer-vision component may be configured to analyze image data received from one or more cameras associated with one or more of the devices. For example, one or more of the devices may include one or more sensors that may detect motion and, in response to detecting motion, may cause a camera to capture images of the environment and generate corresponding image data. In other examples, the cameras may be caused to capture images of the environment periodically and/or based on one or more predefined settings. The computer-vision component may receive the image data and may perform image analysis on the image data to detect the presence of, for example, a person. The analysis may include determining that the image depicts shapes, colors, and/or movement types associated with a person. In examples, the image analysis may include comparing the image data to reference image data that includes a person to determine if the image data depicts a person. In instances where the computer-vision component determines that a person is present in the environment associated with the first device but that a person is not present in the environment associated with another device, this information may be utilized to identify the first device as the primary device for a given functionality.

At block 414, the process 400 may include causing the common functionality to be disabled on the secondary device(s). For example, based at least in part on identifying a device as a primary device, an instruction may be generated and sent to one or more of the secondary devices that causes the functionality to be disabled on the secondary devices. Using wake-word detection functionality as an example, the instruction may cause the wake-word component and/or a digital-signal processor associated with each secondary device to cease processing audio data received by microphones of the secondary devices and/or may cease attempting to detect a wake word from the audio data. By way of further example, for a short-range communication functionality, the instruction may cause the short-range communication component to be disabled such that the device ceases checking for the presence of devices to communicate with and/or ceases receiving data indicating that such devices are present. In examples, the instruction may be generated and sent by the primary device. In other examples, the instruction, which may otherwise be described as a "directive" and/or "directive data" may be generated by a directive generator of the remote system. In other examples, the instruction may be generated by the secondary device itself. Additional details on the generation and sending of directives and/or messages between the devices and/or the remote system are provided below with respect to FIGS. 5 and 6.

At block 416, the process 400 may include exchanging contextual data between the first device and the second device, such as periodically and/or based on a predetermined schedule and/or rules. The contextual data may include signal-strength data, computer-vision data, timing data, battery-life data, user-presence data, and/or other data associated with the operation and/or circumstances surrounding one or more of the devices.

At block 418, the process 400 may include determining whether a triggering event has occurred. Determining whether a triggering event has occurred may be based at least in part on analysis of the contextual data. For example, the triggering event may include the passage of a predetermined amount of time, detection of a change in the environment in which the devices are situated, such as the movement of a user within the environment, the detection of a new device in the environment, the removal of a device from the environment, and/or a change in time from a predefined first time period to a second predefined time period. With respect to the periods of time, it may be determined that functionality management may be performed during a first period of time, such as, for example, from 8:00 am to 5:00 pm on weekdays, while such operations may not be performed during a second period of time, such as, for example, from 5:00 pm to 10:00 pm on weekdays. The periods of time may be established by user input and/or by analysis of device usage patterns indicating when the devices are most frequently used and/or when one person is typically present in the environment. The triggering event may also include receiving an instruction from the remote system and/or one or more other devices to cease operating as the primary device.

If a triggering event has not occurred, then the process 400 may return to block 416 where contextual data may continue to be exchanged. If the triggering event has occurred, then at block 420 the process 400 may include causing the common functionality to be enabled on the secondary device(s). For example, directive data may be sent and may include an instruction to enable the functionality that had been disabled on the secondary device(s). In other examples, a separate instruction may be sent by the remote system and/or the primary device to the secondary device to enable the functionality. In other examples, upon receiving the directive data, the secondary device may instruct itself to enable the functionality.

Figure 5:
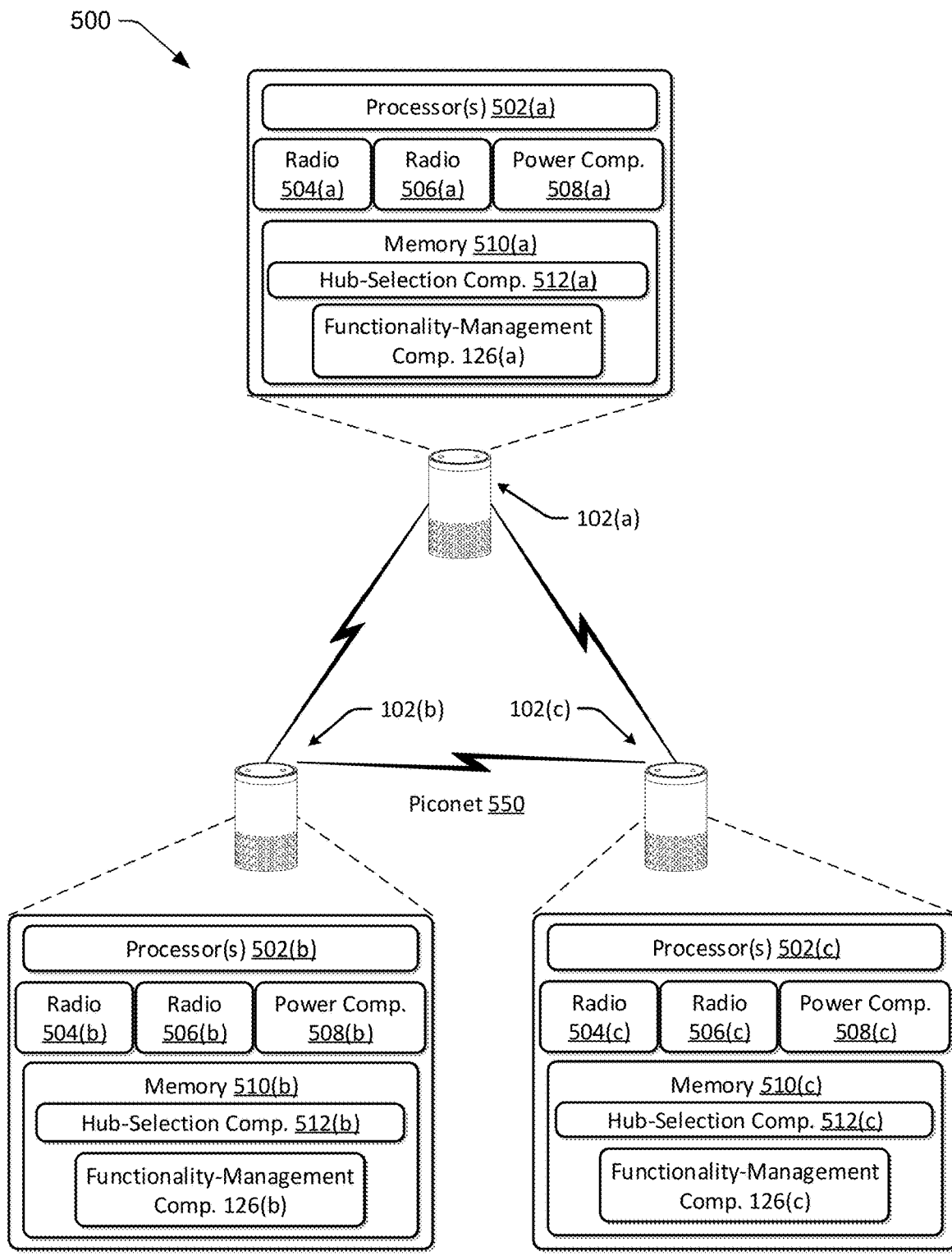
FIG. 5 illustrates example components of example devices utilized for selection of a primary device and secondary devices.

FIG. 5 illustrates example components of example devices utilized for selection of a primary device and secondary devices. As illustrated, a device, also described as a computing device and/or a voice-enabled device and/or a personal device, includes one or more processors 502(a), 502(b), and 502(c), a respective first radio component 504(a), 504(b), and 504(c) for communicating over a wireless network (e.g., LAN, WAN, etc.), and a respective second radio component 506(a), 506(b), and 506(c) for communicating over a short-range wireless connection. In some instances, each device 102(a)-(c) may include a single radio unit to communicate over multiple protocols (e.g., Bluetooth and BLE), two or more radio units to communicate over two or more protocols, or the like. As used herein, a "radio" and "radio component" may be used interchangeably. Again, in some instances, the devices include any other number of radios, including instances where the devices comprise a single radio configured to communicate over two or more different protocols.

In addition, each device may include a respective power component 508(a), 508(b), and 508(c). In examples, one or more of the power components may include a battery. In other examples, one or more of the power components may include a plug and/or other device configured to be plugged into an outlet that provides power. At any given time, each power component may have a particular battery life or level, representing a current charge of the battery. The battery life or level may be measured in any suitable manner, such as by a percentage of charge remaining, an amount of time remaining, or the like. While the techniques described herein are described with reference to devices powered by batteries, it is to be appreciated that the techniques may also apply to devices that receive constant power.

In addition to the above, the devices 102(a)-(c) may include respective memory (or "computer-readable media") 510(a), 510(b), and 510(c), which may store respective instances of a hub-selection component 512(a), 512(b), and 512(c). The hub-selection components 512(a)-(c) may generate messages (e.g., battery-life messages, communication-strength messages, etc.) and one or more maps (e.g., battery-life maps, communication-strength maps, etc.), and may be used to select/determine the hub device, also described herein as the primary device and/or the master device to perform a given functionality. Further, the hub-selection components 512(a)-(c) may send and/or receive the hub-selection messages and store an indication of the selected hub and the amount of time for which the selected device is to act as the hub. The hub-selection components 512(a)-(c) may also set a timer for determining the amount of time for which the selected device is to act as a hub, or may otherwise determine when the time for the device to act as the hub has elapsed, such as upon the occurrence of a triggering event as described more fully herein. The hub-selection components 512(a)-(c) may utilize data from the functionality-management components 126(a)-(c), as described more fully above with respect to FIG. 1, for example. For example, the functionality-management component(s) 126(a)-(c) may determine that one of the devices is to be identified as the primary device for a given functionality while the other devices are to be identified as the secondary devices for the functionality. Based at least in part on this determination, the functionality-management component(s) 126(a)-(c) may be configured to send data and/or an instruction to the hub-selection component(s) 126(a)-(c) to select the primary device and send one or more messages between or among the devices to cause the functionality to be disabled with respect to the secondary devices.

In some instances, messages sent by each device indicate a current battery level of the device (also referred to as a "battery level value"), a current connection strength to the WLAN of the device, information identifying the WLAN, information identifying the device, capability data as described herein, and/or the like. With this information, each hub-selection component 512(a)-(c) may determine the device that is to be selected as the hub device. In some instances, the hub-selection components 512(a)-(c) may implement an algorithm that selects the device based at least in part on device usage data, audio signal strength, user detection information, and/or other data as described herein. In still other instances, each component is configured to implement a cost function that selects the communication hub based on one or more weighted factors, such as current battery levels, connection strengths, and so forth. In other examples, one of the devices may be designated by the user as the hub and/or one of the device may include additional components and/or functionality and may be designed as the hub based at least in part on those additional components and/or functionality.

The devices 102(a)-(c) may couple with one another over a short-range wireless network and thus collectively form a piconet 550. In the illustrated example, each of the devices comprise devices configured to communicate both with one another over a short-range connection as well as over a network 106. In some instances, meanwhile, while the primary device may be configured to communicate over a short-range wireless network and over the network 104, or the secondary devices may be configured to communicate over multiple short-range wireless protocols (e.g., Bluetooth, BLE, etc.) while being incapable of communicating over the network 104. In these instances, the devices 102(a)-(c) may select a hub that communicates with the other devices over a low-power protocol while communicating with the primary device over a higher-power protocol. The primary device may then communicate these messages over the network 104.

Figure 6:
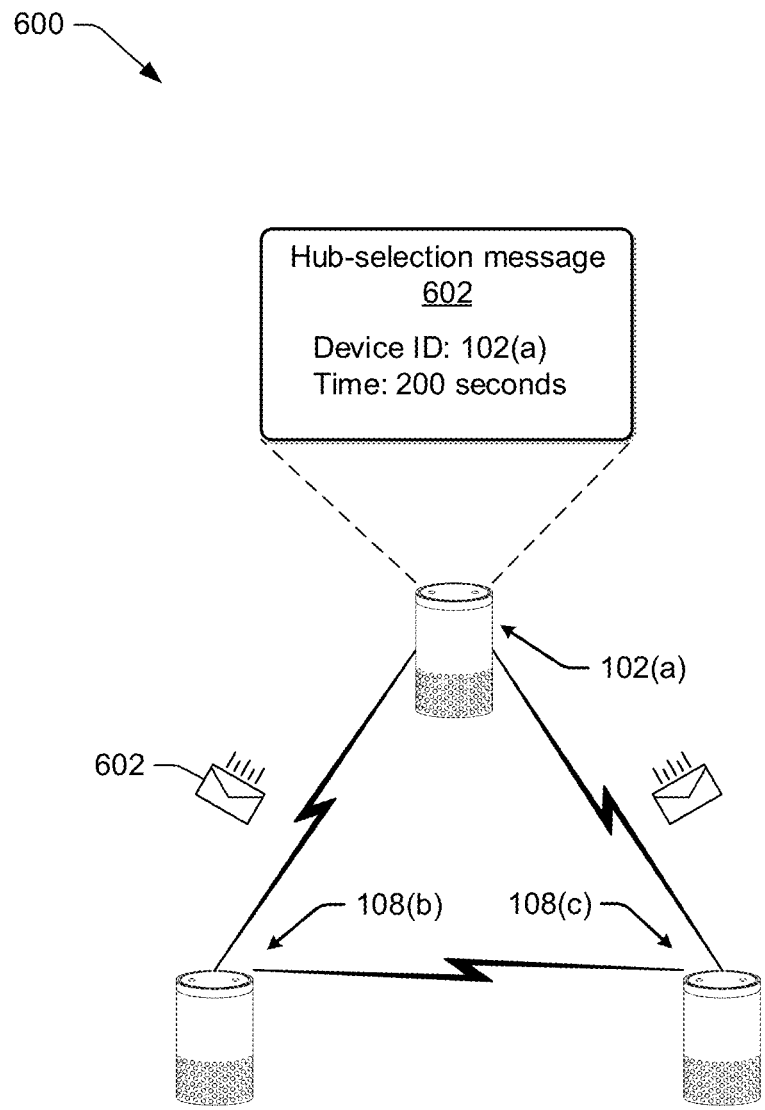
FIG. 6 illustrates an example primary-device selection message that one of the devices in an environment may send to the other devices in response to determining that one device is to act as the primary device.

FIG. 6 illustrates an example hub-selection message that one of the devices in an environment may send to the other devices in response to the device determining that it is to act as the hub device. While FIG. 6 illustrates the selected hub sending this message 602, in this case the device 102(a), in other instances one or more other devices may send this message 602. For instance, one or more of the non-hub devices, otherwise described as the secondary devices, may send this message and/or a remote system may send this message. As illustrated, the hub-selection message may indicate the device identification (DID) of the selected hub device, in this example, the DID of the first device 102(a), as well as the amount of time for which the selected device is to act as the hub device. In examples, this amount of time may be preconfigured and constant, while in other instances it may vary depending on the occurrence of a triggering event as described herein, the number of devices in the piconet, or the like. In response to receiving the hub-selection message 602, the non-hub devices may store an indication of the DID of the hub as well as the amount of time for which the selected device is to act as the hub device. The devices may then again send out messages after expiration of the amount of time or just prior to expiration of this amount of time to determine if the hub device should change.

Figure 7A:
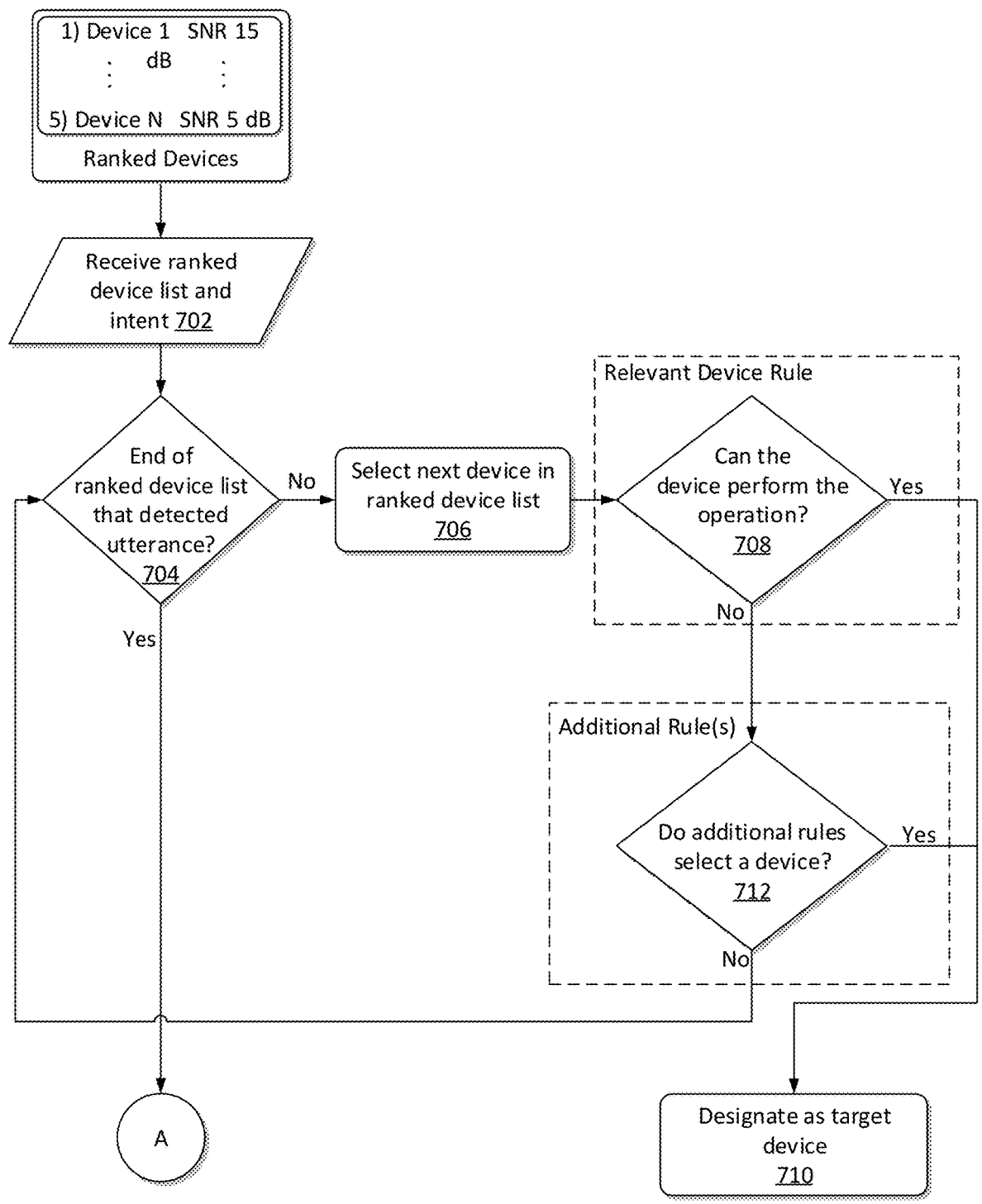
FIG. 7A illustrates a flow diagram of an example process for device arbitration.
Figure 7B:
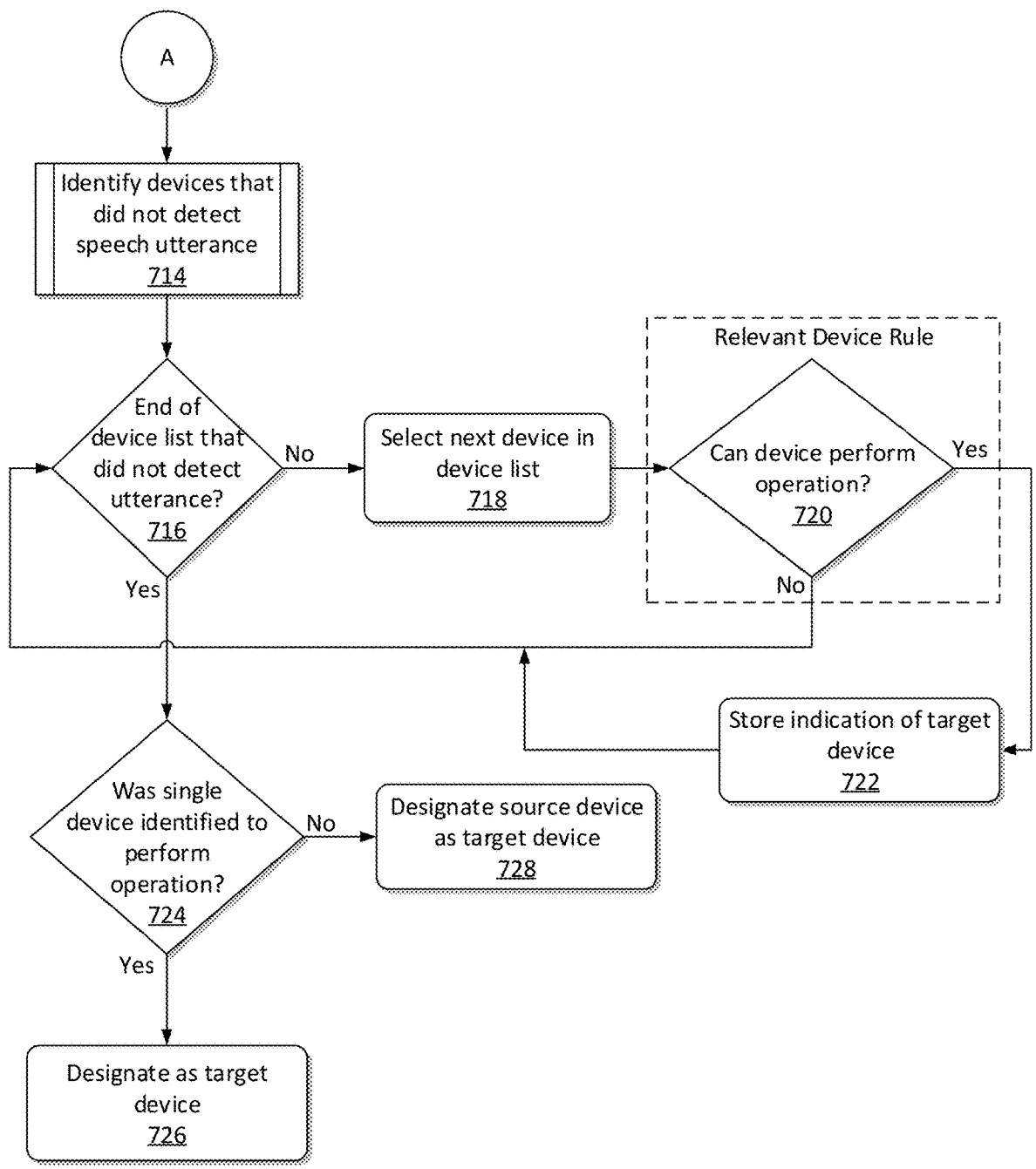
FIG. 7B illustrates a flow diagram of additional operations of the example process for device arbitration from FIG. 7A.

FIG. 7A illustrates a flow diagram of an example process 700 for device arbitration. FIG. 7B illustrates a flow diagram of additional operations of the example process 700 for device arbitration from FIG. 7A. The order in which the operations or steps are described is not intended to be construed as a limitation, and any number of the described operations may be combined in any order and/or in parallel to implement method 700.

At 702, a targeting component of the remote system 104 may receive a ranked list of devices and an intent. The ranked list of devices may be received from the arbitration component 128, and be ranked based on audio signal metric values, for example. The intent may be received from an orchestration component, and determined using the ASR component 148 and NLU component 150. The ranked list of devices may include voice-enabled devices that detected a speech utterance.

At 704, the targeting component may determine whether the method has analyzed all of the voice-enabled devices that detected the speech utterance. If the targeting component determines that the process 700 has not reached the end of the ranked list of devices, the targeting component may proceed to 706.

At 706, the targeting component may select the next device in the ranked device list. At the beginning of the process 700, the targeting component may select the voice-enabled device in the list (e.g., the top ranked device in the ranked list of devices, or "source device").

At 708, the targeting component may determine, during a first iteration, using a first relevant device rule whether the top ranked voice-enabled device ("source device") in the ranked list is capable of responding to the command in the speech utterance. The targeting component may analyze the intent expressed in the speech utterance, as well as the device state, to determine whether the source device is capable of responding to the command in the speech utterance. For example, if the speech utterance is to "please stop," the intent may map to device states which are capable of "stopping" their device state, such as device states of steaming audio, conducting a phone call, outputting an alarm sound, etc.

In various examples, "mapping" between different data (e.g., intents, device states, device identifiers, etc.) may generally correspond to an association in memory or a database between two pieces of data. For instance, a mapping between a particular intent and a particular device state may indicate that the particular intent and the particular device state are indicated as being associated with each other, via any technique known in the art, in a database or other memory structure (e.g., associated in a table, associated by a pointer, etc.).

In some examples, the targeting component may determine that a voice-enabled device is unable to, or is incapable of, responding to the command in the speech utterance. For instance, if the voice-enabled device is in offline (e.g., idle), or in an offline state or idle state, the voice-enabled device may be unable to change volume of audio being output. In some examples, a voice-enabled device may be considered offline when the voice-enabled device is not performing user requested actions (e.g., the voice-enabled device 108 is not outputting audio, outputting video, performing a dialog, etc.).

Using the first rule at 708, if the intent of the speech utterance maps to the device state of the source device, or is "relevant" to the device state of the source device, the targeting component may determine at 710 that the source device is capable of performing the response to the command and select the source device as the voice-enabled device that is to respond to the command in the speech utterance ("target device"). Thus, the targeting component may designate the source device as the target device, and store an indication that the source device is the target device. The targeting component may then send an indication to a speechlet that the source device is the target device at 710.

Alternatively, if the intent expressed in the speech utterance does not map to the device state of the source device, the targeting component may proceed to one or more additional rules and determine, at 712, whether the additional rules select a device. In some examples, the additional rules used at 712 may include determining if the source is device is part of a device "cluster of devices" that has a device state to which the intent maps, or otherwise corresponds. A cluster of devices may correspond to a virtual representation or indication of a group of voice-enabled devices which are synchronized to perform the same action in concert. For instance, the cluster of devices may include multiple voice-enabled devices which are outputting the same audio stream in a uniform fashion such that the different audio streams, which correspond to the same audio content, being output by each of the voice-enabled devices is in sync with each other. The cluster of devices may be stored as a virtual representation such that all of the voice-enabled devices in the cluster appear to be a single device from the perspective of the targeting component. Accordingly, in a similar fashion to the first rule, the targeting component may determine whether the cluster of devices can respond to the command in the speech utterance. The one or more additional rules may include determining a modality of the voice-enabled devices and determining that the response includes output of, for example, image data. In determining which of the devices are candidates for responding, the remote system 104 may consider secondary devices as well as the primary device.

At 712, the targeting component may determine if the intent of the speech utterance maps to the device state of the cluster of devices, or is "relevant" to the device state of the cluster of devices. If the targeting component determines that the cluster of devices can perform the response to the command, the targeting component may select the cluster of devices as the target device at 710.

While several examples of additional rules that could be used at 712 to identify a device are described, any other type of rules for determining whether a device is to respond to a command based on device state data and intent data may be used.

Alternatively, at 712 if the targeting component determines that the source device is not included in a cluster of devices, or at 714 if the targeting component determines that the cluster of devices in which the source device is included is not capable of performing the respond to the command in the speech utterance, the targeting component may, at 712, apply a third rule and determine whether the source device is associated with an accessory device that is capable of performing the response to the command. As described herein, an accessory device may comprise another device that is controlled, or otherwise associated with, a voice-enabled device. For example, types of accessory devices may include, but are not limited to, televisions, lamps/lights, garage doors, door locks, thermostats, garbage disposals, etc.

At 712, if the targeting component determines at that the source device is associated with an accessory device, the targeting component may determine whether the intent maps to a device state of the accessory device. If the targeting component determines that the accessory device is capable of performing the response to the command, the targeting component may select the source device as the target device at 710. For example, if the source device is associated with an accessory device, such as controlling a television based on voice commands from a user, and the command is "next channel," the targeting component may select the source device as the target device at 710 because the accessory device with which the source device is associated is capable of performing the command in the speech utterance.

However, if the targeting component determines at 712 that the source device is not associated with an accessory device, or if the targeting component determines at 712 that the accessory device with which the source device is associated is not capable of performing the command, the targeting component may determine that the source device is not the target device.

If the targeting component determines that the source device is not the target device, the targeting component may return to 704 and determine whether all of the voice-enabled devices have been analyzed. If the targeting component determines that not all of the devices on the ranked list of devices have been analyzed, the targeting component may iteratively use the above described rules 706-718 of the process 700 to determine whether the other voice-enabled devices indicated in the ranked list are the target device. The targeting component may move through the ranked list of devices in order to determine whether any of the voice-enabled devices which detected the speech utterance are the target device.

If the targeting component determines at 704 that all of the voice-enabled devices on the ranked list of devices have been analyzed, the targeting component may proceed to 714.

At 714, the targeting component may identify all other voice-enabled devices associated with the user and/or household account that did not detect the speech utterance. For instance, the targeting component may analyze the user registry 140 to identify devices in the device indications to identify devices associated with the user and/or household account that did not detect the speech utterance.

At 716, the targeting component may determine whether all of the other devices have been analyzed to determine whether they are capable of responding to the command in the speech utterance.

At 718, the targeting component may determine whether the process 700 has analyzed all of the other voice-enabled devices that did not detect the speech utterance.

At 720, if the targeting component determines that other voice-enabled devices remain to be analyzed, the targeting component may determine whether the intent expressed in the speech utterance maps to, or is otherwise associated with, a remaining voice-enabled device. If the intent maps to a device state of a voice-enabled device, the targeting component may store an indication that the voice-enabled device is a target device at 722.

The targeting component may then iteratively move through steps 716-720 for each of the remaining voice-enabled devices that did not detect the speech utterance, and store indications at 722 that a particular voice-enabled device is a target device.

If the targeting component determines at 716 that all of the other voice-enabled devices that did not detect the speech utterance have been analyzed, the targeting component may proceed to 724 and determine whether a single voice-enabled device was identified to perform the operation. If only a single voice-enabled device was identified as being capable of performing the operation or command, the targeting component may designate this device as the target device, and provide this indication to the speechlet.

Alternatively, if the targeting component determines at 724 that more than one voice-enabled device has been indicated as being capable of performing the operation, the targeting component may designate the source device as the target device and provide this indication to the speechlet. The speechlet may then generate output audio data to be sent to the source device which indicates to the user that the speech-processing system 142 was unable to determine how to perform the requested operation.

Thus, the techniques described herein include analyzing contextual data using various rules for to determine which voice-enabled device is intended and/or capable of responding to a command issued in a speech utterance of a user.

Once the targeting component has determined the target device, the targeting component may provide an indication of the target device to a speechlet. The speechlet may use the intent and the indication of the target device to determine a response for the processed speech utterance. For instance, the speechlet may work in conjunction with one or more speechlets that are configured to determine a response for the processed query, determine locations of relevant information for servicing a request from the user and/or generate and store the information if it is not already created, as well as route the identified intents to the appropriate destination speechlet. The destination speechlet may be determined based on the intent determined using the NLU component 150. For example, if the NLU component 150 output includes a command to play music (play music intent), the destination speechlet may be a music playing application, such as one located on the target voice-enabled device, or in a music playing appliance, configured to execute a music playing command. The speechlet may then cause the determined command to be sent to the target device to cause the target device to perform the appropriate response for the command.

In some examples, the speech-processing system 142 may determine various types of operations for the devices to perform. For instance, the speechlet may generate a command to cause the voice-enabled devices and/or accessory devices to change from a first state to a second state (e.g., change the volume of audio output, change a channel on a television, open a garage door, etc.). Additionally, or alternatively, a text-to-speech engine may be employed by the speechlet to generate text to be output as audio by a device. For instance, the text-to-speech engine may generate an audio output to be sent to the source device to indicate to the user that their command has been processed (e.g., "the volume on your device has been lowered"). The audio output may be sent to the source device, and a command to cause a voice-enabled device to change states may also be sent to the target device, which may also be the source device.

Additionally, or alternatively, input data may be received indicating an accuracy associated with device-arbitration processes as described herein. For example, the device-arbitration processes may result in a given device being selected as a target device to perform an action in response to a user command, such as a user utterance. A user may provide input indicating whether the arbitration process correctly identified the device to perform the action. The user may provide a user utterance to voice-enabled devices which, may generate audio data and send that audio data to the remote system for processing. The remote system may utilize the audio data to identify whether the user has indicated that the correct device was selected. This information may be utilized to train and/or otherwise augment the device-arbitration process for future arbitration processes.

Figure 8:
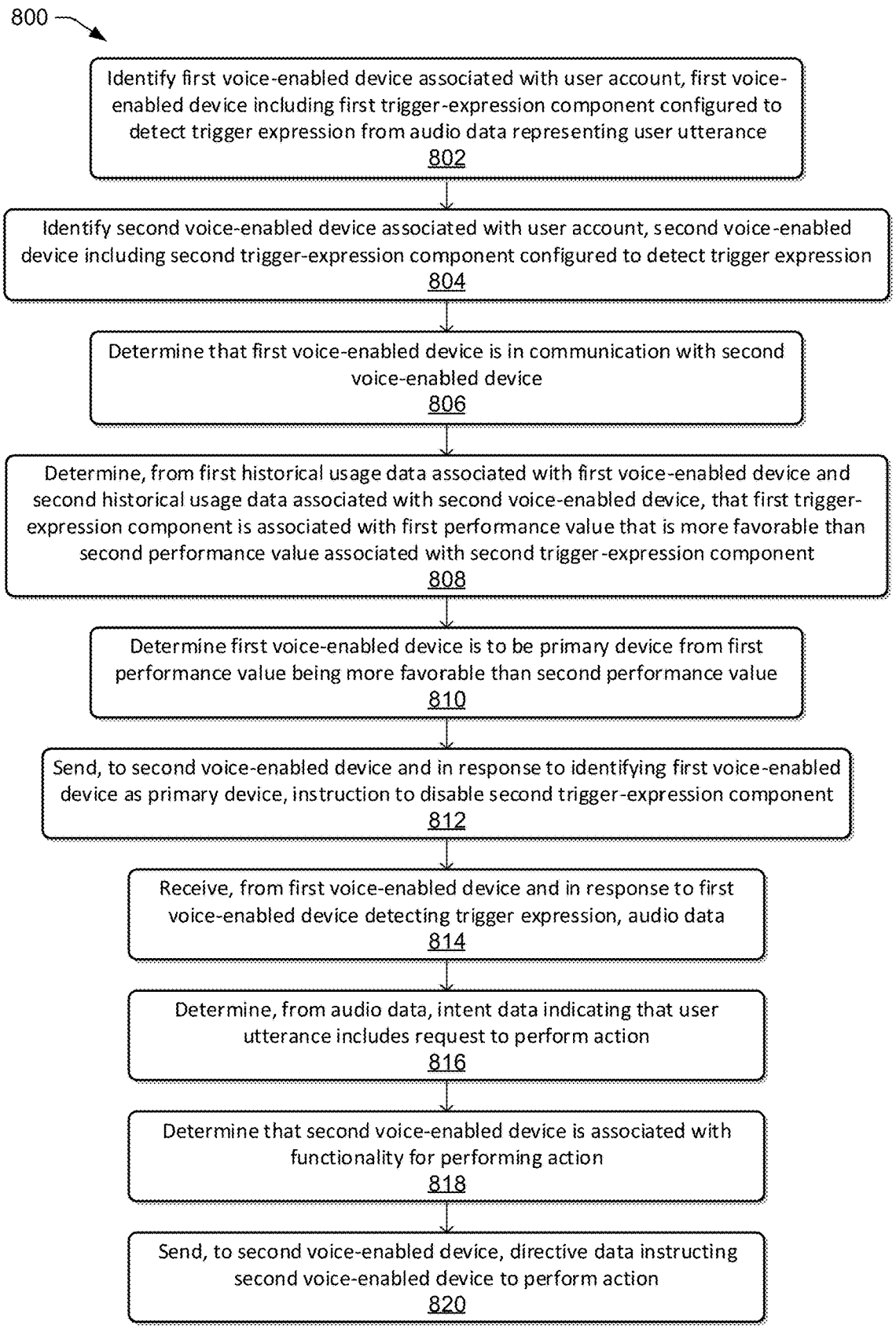
FIG. 8 illustrates a flow diagram of an example process for functionality management for devices.
Figure 9:
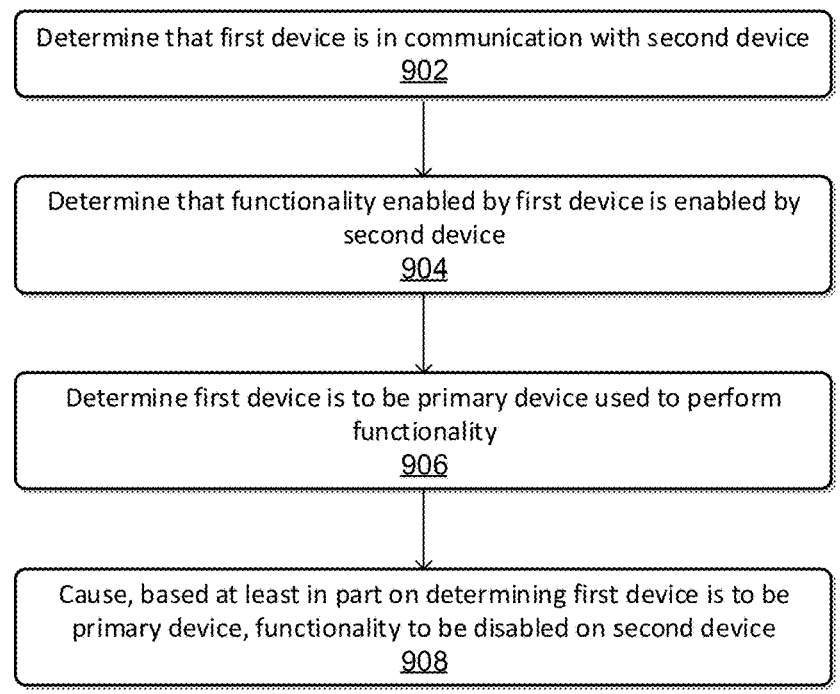
FIG. 9 illustrates a flow diagram of another example process for functionality management for devices.

FIGS. 8 and 9 illustrate processes for functionality management for devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 10-12, although the processes may be implemented in a wide variety of other environments, architectures and systems.

FIG. 8 illustrates a flow diagram of an example process 800 for functionality management for devices. The order in which the operations or steps are described is not intended to be construed as a limitation, and any number of the described operations may be combined in any order and/or in parallel to implement process 800.

At block 802, the process 800 may include identifying a first voice-enabled device associated with a user account. The first voice-enabled device may include a first trigger-expression component configured to detect a trigger expression from audio data representing a user utterance. For example, a remote system may identify, from a user account associated with a user registry, a device identifier associated with a first voice-enabled device associated with the user account. The user account may store data indicating that the first voice-enabled device includes and/or has access to a first trigger-expression component.

At block 804, the process 800 may include identifying a second voice-enabled device associated with the user account. The second voice-enabled device may include a second trigger-expression component configured to detect the trigger expression. Identifying the second voice-enabled device may be performed in the same or a similar manner as identifying the first voice-enabled device. The second voice-enabled device, in examples, may be associated with the same user account as the first voice-enabled device.

At block 806, the process 800 may include determining that the first voice-enabled device is in communication with the second voice-enabled device. For example, the voice-enabled devices, which may be computing devices such as the computing devices 102(*a*)-(*d*) described with respect to FIG. 1, may be configured to communicate with each other over a short-range communication platform and/or utilizing one or more short-range communication protocols. The devices may be configured to send and/or receive signals and/or beacons indicating that the devices are present. The devices, upon receiving signals and/or beacons from each other, may establish a communication channel and/or may be identified as being in communication with each other. In other examples, the devices may be equipped with geolocation components configured to identify the geolocation associated with the devices. Devices with geolocations within a threshold proximity to each other may be in communication with each other. Additionally, or alternatively, the devices may be configured to communicate over a wireless network. When the devices are associated with the same wireless access point, they may be determined to be in communication with each other.

At block 808, the process 800 may include determining, from first historical usage data associated with the first voice-enabled device and second historical usage data associated with the second voice-enabled device, that the first trigger-expression component is associated with a first performance value that is more favorable than a second performance value associated with the second trigger-expression component. For example, a device-usage component may be configured to analyze the historical usage data associated with the devices to determine which device is most favorable for performing a given function, such as wake-word detection, that is common among at least two of the devices. For example, the usage data may indicate one or more of prior usage patterns of the devices, energy consumption of the devices, wake-word detection false-positive rates, device placement within an environment, device modality, and/or user preference data. Some or all of this data may be analyzed by the device-usage component to determine which device to identify as the primary device for a given functionality.

For example, the performance values may correspond to wake-word detection false-positive rates, which may be utilized to determine which device should be identified as the primary device for the wake-word detection functionality. For example, the first device may have a false-positive rate of 1% while the second device may have a false-positive rate of 2%. In these examples, the first device may be identified as the primary device for the wake-word detection functionality based at least in part on the first device having a more favorable false-positive rate than the second device.

Additionally, or alternatively, device placement may be utilized to determine which device to identify as the primary device. For example, a determination may be made that the first device is in a location that is central to the environment, which may be based at least in part on data sent and received from one or more accessory devices situated in the environment and/or based on beamforming results, for example. In these examples, the device that is more centrally located than other devices may be identified as the primary device, while the other devices may be identified as secondary devices.

Additionally, or alternatively, prior usage patterns may indicate that the first device is utilized more frequently than the second device. Prior usage patterns may also take into consideration timing data indicating that a device is utilized more frequently during a given time and/or day than another device, but the other device is utilized more frequently during a different time and/or on a different day. The device identified as the more-frequently used device for a given time may be identified as the primary device. Additionally, or alternatively, energy consumption data may indicate that, for example, the first device uses less energy than the second device. In this example, the device that utilizes less power may be identified as the primary device while other devices may be identified as secondary devices. By way of further example, the energy consumption data may indicate that the first device is configured to obtain power from a power outlet, or otherwise operates after being plugged in to a power source associated with the environment. The second device, to the contrary, may be configured to obtain power from a battery. In these examples, the device that receives power from an outlet may be identified as the primary device and devices that obtain power from batteries may be identified as secondary devices.

Additionally, or alternatively, device modality may be utilized to determine which device to identify as the primary device. For example, device modalities may include the capability to send and receive audio data, image data, or both. For given functionalities, certain device modalities may be useful for performing such functionalities. By way of example, a device functionality may include the ability to detect the presence of movement based at least in part on analysis of image data generated by a camera of a device. In these examples, a device with a modality that includes the capability to send and/or receive image data may be identified as the primary device, while devices without the capability to send and/or receive image data may be identified as secondary devices. Additionally, or alternatively, user preference data may be utilized to identify primary and secondary devices. For example, during setup of a device and/or at some point after setup, the user may provide input indicating that a certain device is to be identified as a primary device, such as for given functionalities. In these examples, the user preference data may be utilized to identify a device as a primary device.

In addition to using the usage data described herein, determining which device is to be identified as the primary device may be based at least in part on analyses performed by a signal-strength component and/or a computer-vision component. For example, using wake-word detection as an example functionality, identifying a device as a primary device may be based at least in part on an audio signal strength received at each device. For example, audio may be captured by microphones of each device, and the audio captured by the microphones of the first device may have a first signal strength while the audio captured by the microphones of the second device may have a second signal strength that is less than the first signal strength. In this example, the differing signal strengths may indicate that a user is closer to the first device than the second device. Additionally, or alternatively, the first signal strength may be associated with a first signal-to-noise value and the second signal strength may be associated with a second signal-to-noise value that is less than the first signal-to-noise value. Based at least in part on these determinations, the first voice-enabled device may be identified as the primary device and the second voice-enabled device may be identified as the secondary device.

Additionally, or alternatively, the computer-vision component may be configured to analyze image data received from one or more cameras associated with one or more of the devices. For example, one or more of the devices may include one or more sensors that may detect motion and, in response to detecting motion, may cause a camera to capture images of the environment and generate corresponding image data. In other examples, the cameras may be caused to capture images of the environment periodically and/or based on one or more predefined settings. The computer-vision component may receive the image data and may perform image analysis on the image data to detect the presence of, for example, a person. The analysis may include determining that the image depicts shapes, colors, and/or movement types associated with a person. In examples, the image analysis may include comparing the image data to reference image data that includes a person to determine if the image data depicts a person. In instances where the computer-vision component determines that a person is present in the environment associated with the first device but that a person is not present in the environment associated with another device, this information may be utilized to identify the first device as the primary device for a given functionality.

At block 810, the process 800 may include determining the first voice-enabled device is to be a primary device from the first performance value being more favorable than the second performance value. Additionally, or alternatively, the remote system may determine the first device is to be the primary device based at least in part on one or more of the data and/or analyses described above with respect to block 808.

At block 812, the process 800 may include sending, to the second voice-enabled device and in response to identifying the first voice-enabled device as the primary device, an instruction to disable the second trigger-expression component. For example, based at least in part on identifying a device as a primary device, an instruction may be generated and sent to one or more of the secondary devices that causes the functionality to be disabled on the secondary devices. Using wake-word detection functionality as an example, the instruction may cause the wake-word component and/or a digital-signal processor associated with each secondary device to cease processing audio data received by microphones of the secondary devices and/or may cease attempting to detect a wake word from the audio data. By way of further example, for a short-range communication functionality, the instruction may cause the short-range communication component to be disabled such that the device ceases checking for the presence of devices to communicate with and/or ceases receiving data indicating that such devices are present. In examples, the instruction may be generated and sent by the primary device. In other examples, the instruction, which may otherwise be described as a "directive" and/or "directive data" may be generated by a directive generator of the remote system. In other examples, the instruction may be generated by the secondary device itself.

At block 814, the process 800 may include receiving, from the first voice-enabled device and in response to the first voice-enabled device detecting the trigger expression, the audio data. For example, input data may comprise audio data, which may correspond to audio representing a user utterance spoken by a user and captured by microphones of the primary device. The primary device may generate the audio data and send the audio data to the remote system. In other examples, the input data may correspond to user input to a personal device. For example, the personal device may have stored thereon and/or access to an application associated with the devices. The application may include a graphical user interface that may be utilized to display information and/or to receive inputs from the user. The user may, for example, select a portion of a screen associated with the application. The personal device may generate corresponding input data and send the input data to the remote system.

At block 816, the process 800 may include determining, from the audio data, intent data indicating that the user utterance includes a request to perform an action. For example, an ASR component may generate text data that corresponds to the audio data, and an NLU component may generate intent data corresponding to the text data. The intent data may indicate that the user utterance includes a request to perform an action, such as operating an accessory device, outputting audio, and/or displaying images.

At block 818, the process 800 may include determining that the second voice-enabled device is associated with functionality for performing the action. For example, the user registry may maintain data indicating one or more functionalities associated with the devices and/or one or more third-party databases may maintain such data. The remote system may attempt to determine whether the action to be performed may be performed using one or more of the functionalities. For example, if the action is displaying images, data indicating that the device includes a display and/or includes functionality that may cause an associated accessory device to display images may be utilized. Device-arbitration operations may be performed to determine which device of multiple devices should be selected to perform the action. Device arbitration is described in more detail elsewhere herein.

At block 820, the process 800 may include sending, to the second voice-enabled device, directive data instructing the second voice-enabled device to perform the action. The directive data may include one or more instructions configured to cause processors of the second device to perform the action, such as cause output of audio, display of images, and/or performance of other operations. In examples, the directive data may be sent from the remote system to the primary device, which may send the directive data to the secondary device. It should be understood that the device-arbitration described herein may be utilized to determine which device is to respond to a user utterance and/or which device is to perform an action in response to the user utterance. In examples, the device to respond and the device to perform the action may be the same device, such as when a device including a speaker is configured to output audio corresponding to a requested song and respond to the user by outputting audio that the requested song will be played. In other examples, the device to respond and the device to perform the action may be different devices, such as when a first device presents images corresponding to a requested movie and a second device, such as a voice-enabled device, responds to the user by outputting audio that the requested movie will be presented by the first device.

Additionally, or alternatively, the process 800 may include determining that the second short-range communication component has been configured to communicate with an accessory device and determining that an association between the first short-range communication component and the accessory device is absent. The process 800 may also include identifying, from the second short-range communication component being configured to communicate with the accessory device and the association between the first short-range communication component and the accessory device being absent, the second voice-enabled device as a second primary device with respect to short-range communication. The process 800 may also include sending, to the first voice-enabled device and based at least in part on identifying the second voice-enabled device as the second primary device, a second instruction to disable the first short-range communication component.

Additionally, or alternatively, the process 800 may include determining that the first voice-enabled device receives power from a power outlet associated with an environment in which the first voice-enabled device is disposed during a period of time and determining that the second voice-enabled device receives power from a battery of the second voice-enabled device during the period of time. In these examples, determining the first voice-enabled device is to be the primary device may comprise determining the first voice-enabled device is to be the primary device based at least in part on determining that the first voice-enabled device receives power from the power outlet during the period of time and from determining that the second voice-enabled device receives power from the battery during the period of time.

Additionally, or alternatively, the process 800 may include sending, from sending the directive data, a second instruction to the second voice-enabled device, the second instruction configured to cause the second trigger-expression component to activate for a period of time. The process 800 may also include receiving, during the period of time and in response to the second voice-enabled device detecting the trigger expression, second audio data representing a second user utterance. The process 800 may also include determining that the period of time has lapsed and sending, from determining that the period of time has lapsed, a third instruction to the second voice-enabled device. In these examples, the third instruction may cause the second trigger-expression component to be disabled.

FIG. 9 illustrates a flow diagram of another example process 900 for functionality management for devices. The order in which the operations or steps are described is not intended to be construed as a limitation, and any number of the described operations may be combined in any order and/or in parallel to implement process 900.

At block 902, the process 900 may include determining that a first device is in communication with a second device. For example, the devices, which may be computing devices such as the computing devices 102(*a*)-(*d*) described with respect to FIG. 1, may be configured to communicate with each other over a short-range communication platform and/or utilizing one or more short-range communication protocols. The devices may be configured to send and/or receive signals and/or beacons indicating that the devices are present. The devices, upon receiving signals and/or beacons from each other, may establish a communication channel and/or may be identified as being in communication with each other. In other examples, the devices may be equipped with geolocation components configured to identify the geolocation associated with the devices. Devices with geolocations within a threshold proximity to each other may be in communication with each other. Additionally, or alternatively, the devices may be configured to communicate over a wireless network. When the devices are associated with the same wireless access point, they may be determined to be in communication with each other.

At block 904, the process 900 may include determining that a functionality enabled by the first device is enabled by the second device. For example, capability data may be sent from the devices to a remote system. The capability data may indicate one or more functionalities associated with each device. For example, a first device may include functionalities such as wake-word detection, short-range communication, and echo cancellation. A second device may include functionalities such as wake-word detection and short-range-communication, but not echo cancellation. In this example, the first and second devices may have common functionalities including wake-word detection and short-range communication. In other examples, the devices may exchange the capability data among the devices and one or more of the devices may communicate the common functionalities to the remote system. In other examples, the devices may be associated with a user account associated with the remote system. The user account may store data indicating the functionalities of the devices, which may be based at least in part on the device identifiers of the devices and/or the device types and/or device specifications known to the remote system.

At block 906, the process 900 may include determining the first device is to be a primary device used to perform the functionality. For example, a device-usage component may be configured to analyze historical usage data associated with the devices to determine which device is most favorable for performing a given function, such as wake-word detection, that is common among at least two of the devices. For example, the usage data may indicate one or more of prior usage patterns of the devices, energy consumption of the devices, wake-word detection false-positive rates, device placement within an environment, device modality, and/or user preference data. Some or all of this data may be analyzed by the device-usage component to determine which device to identify as the primary device for a given functionality.

For example, the performance values may correspond to wake-word detection false-positive rates, which may be utilized to determine which device should be identified as the primary device for the wake-word detection functionality. For example, the first device may have a false-positive rate of 1% while the second device may have a false-positive rate of 2%. In these examples, the first device may be identified as the primary device for the wake-word detection functionality based at least in part on the first device having a more favorable false-positive rate than the second device.

Additionally, or alternatively, device placement may be utilized to determine which device to identify as the primary device. For example, a determination may be made that the first device is in a location that is central to the environment, which may be based at least in part on data sent and received from one or more accessory devices situated in the environment and/or based on beamforming results, for example. In these examples, the device that is more centrally located than other devices may be identified as the primary device, while the other devices may be identified as secondary devices.

Additionally, or alternatively, prior usage patterns may indicate that the first device is utilized more frequently than the second device. Prior usage patterns may also take into consideration timing data indicating that a device is utilized more frequently during a given time and/or day than another device, but the other device is utilized more frequently during a different time and/or on a different day. The device identified as the more-frequently used device for a given time may be identified as the primary device. Additionally, or alternatively, energy consumption data may indicate that, for example, the first device uses less energy than the second device. In this example, the device that utilizes less power may be identified as the primary device while other devices may be identified as secondary devices. By way of further example, the energy consumption data may indicate that the first device is configured to obtain power from a power outlet, or otherwise operates after being plugged in to a power source associated with the environment. The second device, to the contrary, may be configured to obtain power from a battery. In these examples, the device that receives power from an outlet may be identified as the primary device and devices that obtain power from batteries may be identified as secondary devices.

Additionally, or alternatively, device modality may be utilized to determine which device to identify as the primary device. For example, device modalities may include the capability to send and receive audio data, image data, or both. For given functionalities, certain device modalities may be useful for performing such functionalities. By way of example, a device functionality may include the ability to detect the presence of movement based at least in part on analysis of image data generated by a camera of a device. In these examples, a device with a modality that includes the capability to send and/or receive image data may be identified as the primary device, while devices without the capability to send and/or receive image data may be identified as secondary devices. Additionally, or alternatively, user preference data may be utilized to identify primary and secondary devices. For example, during setup of a device and/or at some point after setup, the user may provide input indicating that a certain device is to be identified as a primary device, such as for given functionalities. In these examples, the user preference data may be utilized to identify a device as a primary device.

In addition to using the usage data described herein, determining which device is to be identified as the primary device may be based at least in part on analyses performed by a signal-strength component and/or a computer-vision component. For example, using wake-word detection as an example functionality, identifying a device as a primary device may be based at least in part on an audio signal strength received at each device. For example, audio may be captured by microphones of each device, and the audio captured by the microphones of the first device may have a first signal strength while the audio captured by the microphones of the second device may have a second signal strength that is less than the first signal strength. In this example, the differing signal strengths may indicate that a user is closer to the first device than the second device. Additionally, or alternatively, the first signal strength may be associated with a first signal-to-noise value and the second signal strength may be associated with a second signal-to-noise value that is less than the first signal-to-noise value. Based at least in part on these determinations, the first voice-enabled device may be identified as the primary device and the second voice-enabled device may be identified as the secondary device.

Additionally, or alternatively, the computer-vision component may be configured to analyze image data received from one or more cameras associated with one or more of the devices. For example, one or more of the devices may include one or more sensors that may detect motion and, in response to detecting motion, may cause a camera to capture images of the environment and generate corresponding image data. In other examples, the cameras may be caused to capture images of the environment periodically and/or based on one or more predefined settings. The computer-vision component may receive the image data and may perform image analysis on the image data to detect the presence of, for example, a person. The analysis may include determining that the image depicts shapes, colors, and/or movement types associated with a person. In examples, the image analysis may include comparing the image data to reference image data that includes a person to determine if the image data depicts a person. In instances where the computer-vision component determines that a person is present in the environment associated with the first device but that a person is not present in the environment associated with another device, this information may be utilized to identify the first device as the primary device for a given functionality.

At block 908, the process 900 may include causing, based at least in part on determining the first device is to be the primary device, the functionality to be disabled on the second device. For example, based at least in part on identifying a device as a primary device, an instruction may be generated and sent to one or more of the secondary devices that causes the functionality to be disabled on the secondary devices. Using wake-word detection functionality as an example, the instruction may cause the wake-word component and/or a digital-signal processor associated with each secondary device to cease processing audio data received by microphones of the secondary devices and/or may cease attempting to detect a wake word from the audio data. By way of further example, for a short-range communication functionality, the instruction may cause the short-range communication component to be disabled such that the device ceases checking for the presence of devices to communicate with and/or ceases receiving data indicating that such devices are present. In examples, the instruction may be generated and sent by the primary device. In other examples, the instruction, which may otherwise be described as a "directive" and/or "directive data" may be generated by a directive generator of the remote system. In other examples, the instruction may be generated by the secondary device itself.

Additionally, or alternatively, the process 900 may include determining that the second short-range communication component has been configured to communicate with a third device, such as an accessory device, and determining that an association between the first short-range communication component and the third device is absent. The process 900 may also include sending, to the first device and based at least in part on determining that the association between the first short-range communication component and the third device is absent, a second instruction to disable the first short-range communication component.

Additionally, or alternatively, the process 900 may include storing functionality-management data indicating that, for the functionality, the first device has previously been selected as the primary device and/or that the second device has previously been selected as a secondary device. Selection, identification, and/or determination of a given device as a primary device may be performed based at least in part on the data and/or analyses described with respect to block 906, above. Data indicating such past selections, identifications, and/or determinations may be stored and utilized as a factor for selecting, identifying, and/or determining primary devices. For example, the process 900 may include determining the first device is to be the primary device based at least in part on the functionality-management data.

Additionally, or alternatively, the process 900 may include determining that the first device receives power from a power outlet associated with an environment in which the first device is disposed during a time period and determining that the second device receives power from a battery of the second device during the time period. In these examples, determining the first device is to be the primary device may comprise determining the first device is to be the primary device based at least in part on determining that the first device receives power from the power outlet during the time period and from determining that the second device receives power from the battery during the time period.

Additionally, or alternatively, the process 900 may include receiving, from the first device, input data requesting an action to be performed and determining that the second device is configured to perform the action. The process 900 may include causing the second device to perform the action and sending, based at least in part on causing the second device to perform the action, an instruction to the second device. The instruction may cause the functionality to activate for a period of time. The process 900 may also include receiving, during the period of time and based at least in part on the second device receiving input, second input data requesting another action to be performed. The process 900 may also include determining that the period of time has lapsed and sending an instruction to the second device causing the functionality to be disabled based at least in part on determining that the period of time has lapsed.

Additionally, or alternatively, the process 900 may include receiving, at the first device and from the second device, first capability data indicating functionalities including the functionality that the second device is configured to perform. The process 900 may also include storing, at the first device, second capability data indicating that the first device is configured to perform the functionality. In these examples, determining that the functionality is enabled by the first device and the second device comprises determining that the functionality is enabled by the first device and the second device based at least in part on the first capability data and the second capability data. The process 900 may also include determining, based at least in part on usage data associated with the first device and the second device, that the functionality is performed more by the first device than the second device. In these examples, determining the first device is to be the primary device comprises determining the first device is to be the primary device based at least in part on determining that the functionality is performed more by the first device than the second device. Here, causing the functionality to be disabled on the second device may comprise causing the functionality to be disabled based at least in part on sending, from the first device, an instruction to the second device, with the instruction causing the functionality to be disabled.

Additionally, or alternatively, the process 900 may include storing usage pattern data indicating a first time period of a day that at least one of the first device or the second device receives a first amount of input from a user below a threshold amount of input. The usage pattern data may also indicate a second time period of the day that at least one of the first device or the second device receives a second amount of input from the user above the threshold amount of input. In these examples, determining the first device is to be the primary device may comprise determining the first device is to be the primary device during the first time period.

Additionally, or alternatively, the process 900 may include receiving, from the first device and based at least in part on the first device detecting a wake word using wakeword functionality, audio data representing a user utterance. The process 900 may also include determining the first device is a first type of device that is different than the second device that is a second type of device. The process 900 may also include generating, based at least in part on the audio data, first intent data using first machine-learned models specific to the first type of device and generating second intent data using second machine-learned models specific to the second type of device. The process 900 may also include determining that a first confidence value associated with the first intent data is more favorable than a second confidence value associated with the second intent data and generating directive data using the first intent data. This process is described in more detail with respect to FIG. 13, below.

Additionally, or alternatively, the process 900 may include determining that audio representing a user utterance received at a first microphone of the first device has a first signal strength and determining that the audio received at a second microphone of the second device has a second signal strength. In these examples, the second signal strength may be greater than the first signal strength. The process 900 may also include causing, at the second device, the functionality to be activated based at least in part on the second signal strength being greater than the first signal strength and causing, at the first device, the functionality to be deactivated based at least in part on the second signal strength being greater than the first signal strength.

Additionally, or alternatively, the process 900 may include determining, based at least in part on at least one of first audio data or first image data from the first device, that a user is present in the first environment. Here, determining the first device is to be the primary device comprises determining the first device is to be the primary device based at least in part on determining that the user is present in the first environment. The process 900 may also include determining, based at least in part on at least one of second audio data or second image data from the second device, that the user has moved from the first environment to the second environment. The process 900 may also include determining, based at least in part on determining that the user has moved from the first environment to the second environment, the second device is to be the primary device. The process 900 may also include causing, based at least in part on determining the second device is to be the primary device, the functionality to be enabled on the second device and causing, based at least in part on determining the second device is to be the primary device, the functionality to be disabled on the first device.

Additionally, or alternatively, the process 900 may include receiving, based at least in part on a predefined schedule and from the first device, status data indicating that the first device is in an active state. For example, the devices may communicate with the remote system continuously, periodically, randomly, and/or in light of a predefined schedule. The devices may send status data indicating that the devices are operational and/or that the devices are in a given mode, such as an active mode. In other examples, the remote system may request status data from the devices, which may provide the status data in response to the request. The process 900 may also include determining that a state change has occurred. In these examples, the state change may indicate that the first device has transitioned to a deactivated state and/or a state of the first device is undetermined. For example, a device may be unplugged, powered off, or otherwise be removed from an environment associated with a group of devices. In these examples, the status data may indicate such a state change in the device, and/or the device may not be able to send status data such as when the device is powered off and/or unplugged. In these examples, the process 900 may include causing, based at least in part on determining that the state change has occurred, the functionality to be enabled on the second device.

Figure 10:
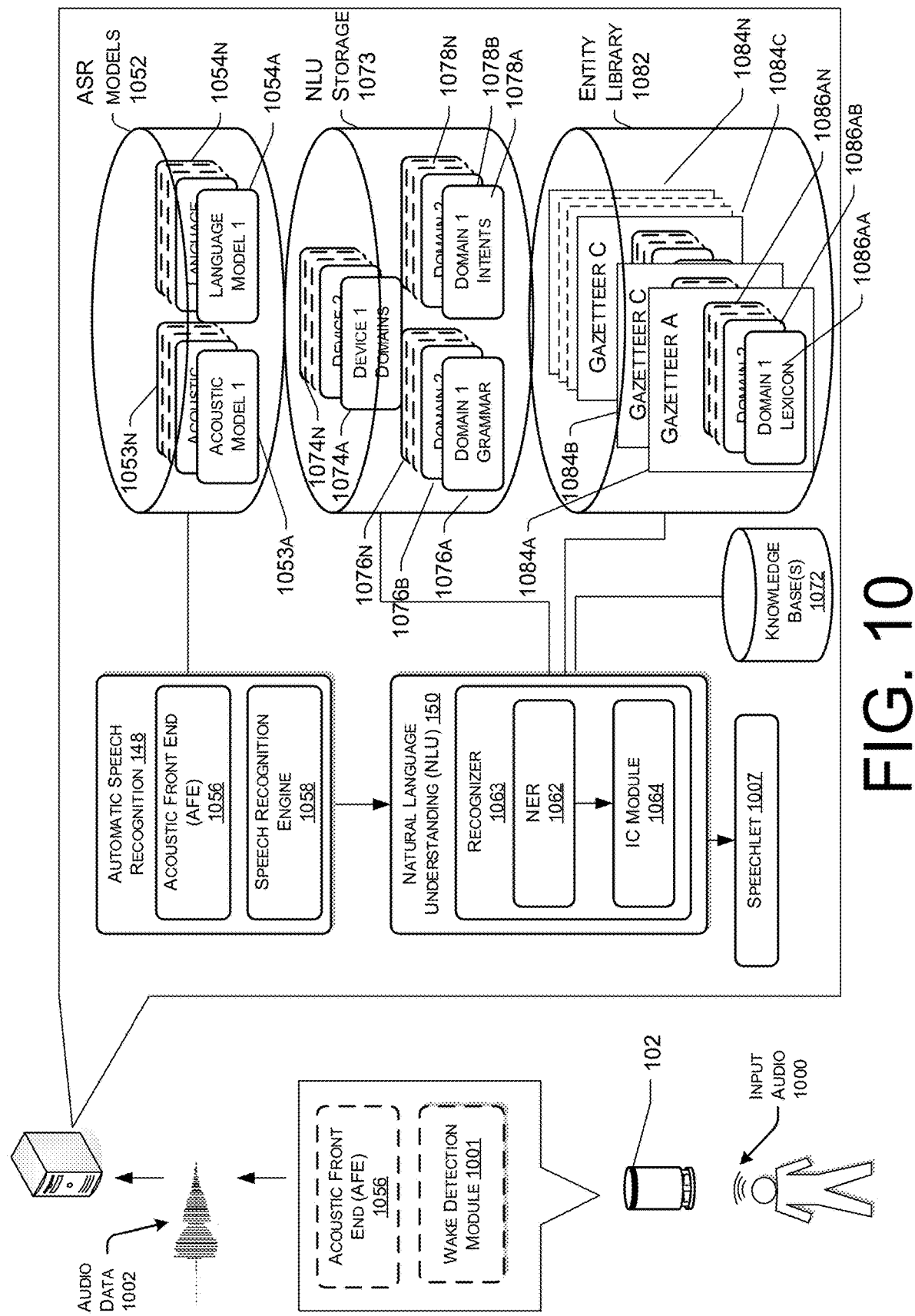
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 104). The various components illustrated may be located on a same or different physical devices. Message between various components illustrated in FIG. 10 may occur directly or across a network 106. An audio capture component, such as a microphone 114 of the device 102, or another device, captures audio 1000 corresponding to a spoken utterance. The device 102, using a wake-word component 130, then processes audio data corresponding to the audio 1000 to determine if a keyword (such as a wakeword) is detected in the audio data. Following detection of a wakeword, the device 102 sends audio data 1002 corresponding to the utterance to the remote system 104 that includes an ASR module 148. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR module 148 of the remote system 104.

The wake-word component 130 works in conjunction with other components of the user device, for example a microphone to detect keywords in audio 1000. For example, the device may convert audio 1000 into audio data, and process the audio data with the wake-word component 130 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 130 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 130 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1002 corresponding to input audio 1000 to the remote system 104 for speech processing. Audio data corresponding to that audio may be sent to remote system 104 for routing to a recipient device or may be sent to the remote system 104 for speech processing for interpretation of the included speech (either for purposes of enabling voice-messages and/or for purposes of executing a command in the speech). The audio data 1002 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 104, an ASR module 148 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 148 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056) and transmit that information to a server across a network for ASR processing. Feature vectors may arrive at the remote system 104 encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on lights." The wake detection module may identify the wake word, otherwise described as a trigger expression, "Alexa," in the user utterance and may "wake" based on identifying the wake word. Audio data corresponding to the user utterance may be sent to the remote system 104, where the speech recognition engine 1058 may identify, determine, and/or generate text data corresponding to the user utterance, here "turn on lights."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 104, for natural language understanding (NLU) processing, such as conversion of the text into commands for execution, either by the user device, by the remote system 104, or by another device (such as a server running a specific application like a search engine, etc.).

The device performing NLU processing 150 (e.g., server 104) may include various components, including potentially dedicated processor(s), memory, storage, etc. As shown in FIG. 10, an NLU component 150 may include a recognizer 1063 that includes a named entity recognition (NER) module 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 148 based on the utterance input audio 1000) and attempts to make a semantic interpretation of the text. That is, the NLU process determines the meaning behind the text based on the individual words and then implements that meaning. NLU processing 150 interprets a text string to derive an intent or a desired action from the user as well as the pertinent pieces of information in the text that allow a device (e.g., device 102) to complete that action. For example, if a spoken utterance is processed using ASR 148 and outputs the text "turn on lights" the NLU process may determine that the user intended to establish to operate or otherwise turn on one or more devices with a naming indicator of "lights."

The NLU may process several textual inputs related to the same utterance. For example, if the ASR 148 outputs N text segments (as part of an N-best list), the NLU may process all N outputs to obtain NLU results.

As will be discussed further below, the NLU process may be configured to parse and tag to annotate text as part of NLU processing. For example, for the text "turn on office light," "turn on" may be tagged as a command (to activate a device) and "office light" may be tagged as the naming identifier of the device with which to activate.

To correctly perform NLU processing of speech input, an NLU process 150 may be configured to determine a "domain" of the utterance so as to determine and narrow down which services offered by the endpoint device (e.g., remote system 104 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1062 receives a query in the form of ASR results and attempts to identify relevant grammars and lexical information that may be used to construe meaning. To do so, the NLU module 150 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) module 1064 parses the query to determine an intent or intents for each identified domain, where the intent corresponds to the action to be performed that is responsive to the query. Each domain is associated with a database (1078a-1078n) of words linked to intents. For example, a smart-home intent database may link words and phrases such as "turn on," "activate," "on," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 1064 identifies potential intents for each identified domain by comparing words in the query to the words and phrases in the intents database 1078. In some instances, the determination of an intent by the IC module 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC module 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on office light" is an identified intent, a grammar (1076) framework or frameworks may correspond to sentence structures such as "turn on {office light}."

For example, the NER module 1062 may parse the query to identify words as subject, object, verb, preposition, etc., based on grammar rules and/or models, prior to recognizing named entities. The identified verb may be used by the IC module 1064 to identify intent, which is then used by the NER module 1062 to identify frameworks. A framework for the intent of "play a song," meanwhile, may specify a list of slots/fields applicable to play the identified "song" and any object modifier (e.g., specifying a music collection from which the song should be accessed) or the like. The NER module 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1062 may search the database of generic words associated with the domain (in the knowledge base 1072). So, for instance, if the query was "turn on office light," after failing to determine which device to operate, the NER component 1062 may search the domain vocabulary for the phrase "office light". In the alternative, generic words may be checked before the gazetteer information, or both may be tried, potentially producing two different results.

The output data from the NLU processing (which may include tagged text, commands, etc.) may then be sent to a speechlet 1007. The destination speechlet 1007 may be determined based on the NLU output. For example, if the NLU output includes a command to send a message, the destination speechlet 1007 may be a message sending application, such as one located on the user device or in a message sending appliance, configured to execute a message sending command. If the NLU output includes a search request, the destination speechlet 1007 may include a search engine processor, such as one located on a search server, configured to execute a search command After the appropriate command is generated based on the intent of the user, the speechlet 1007 may provide some or all of this information to a text-to-speech (TTS) engine. The TTS engine may then generate an actual audio file for outputting the audio data determined by the speechlet 1007 (e.g., "okay," or "we couldn't find office light"). After generating the file (or "audio data"), the TTS engine may provide this data back to the remote system 104.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 150 during runtime operations where NLU operations are performed on text (such as text output from an ASR component 148). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC module 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 104, as illustrated herein are exemplary, and may be located in a stand-alone device or may be included, in whole or in part, as a component of a larger device or system, may be distributed across a network or multiple devices connected by a network, etc.

Figure 11:
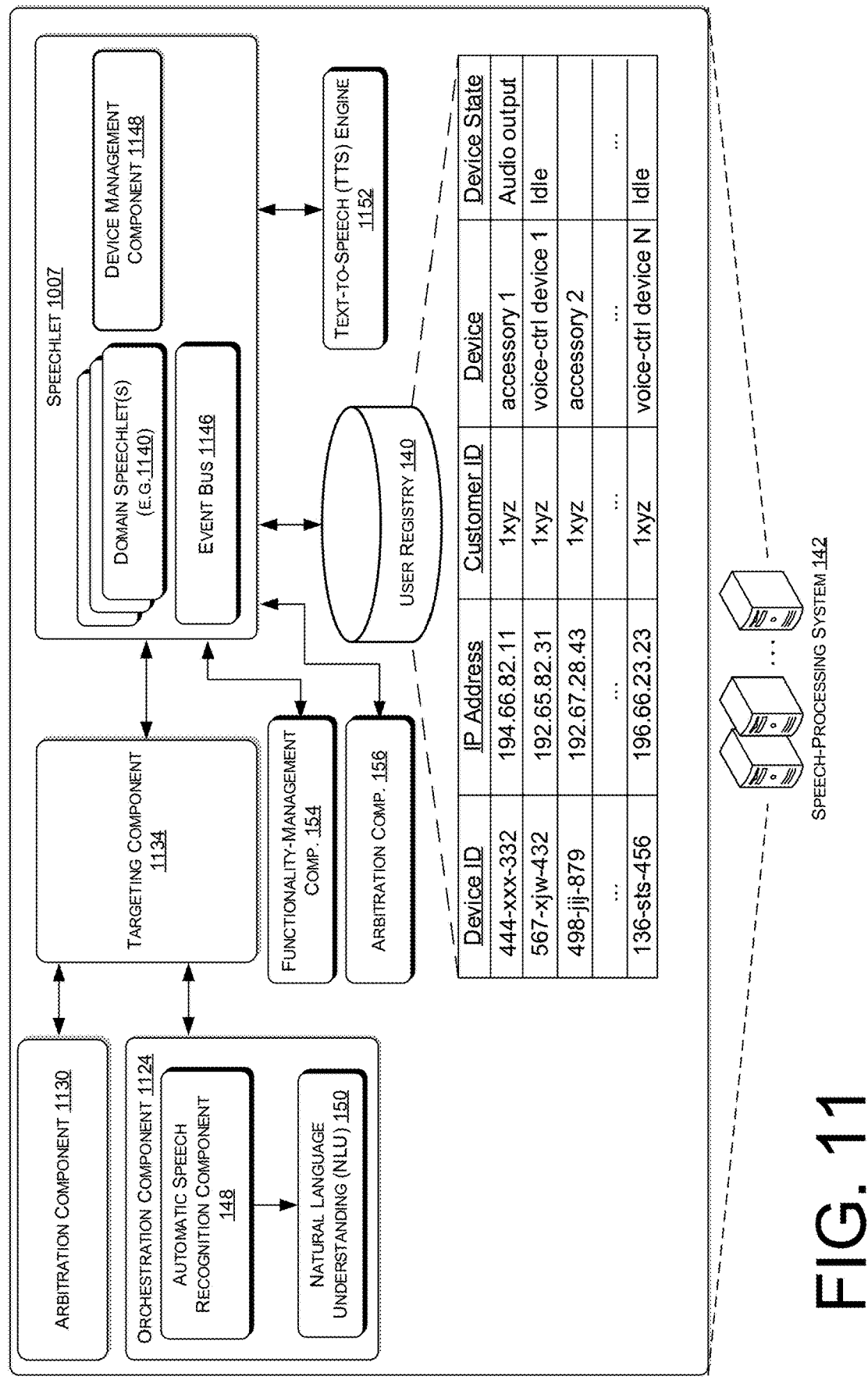
FIG. 11 illustrates a conceptual diagram of components of a speech-processing system for functionality management for devices.

FIG. 11 illustrates a conceptual diagram of components of a speech-processing system 142 associating audio output commands with multiple devices, including a speechlet 1007 configured to generate a command that the selected voice-enabled device uses to respond to a user utterance. As used with respect to FIG. 11, a voice-enabled device may include a voice-enabled device 102, such as described with respect to FIG. 1. As illustrated in FIG. 11, the speech-processing system 142, including the orchestration component 1124 comprising the ASR component 148 and the NLU component 150, may be coupled to the targeting component 1134 and provide the targeting component 1134 with the intent determined to be expressed in the user utterance. Further, the arbitration component 128 may provide the ranked list of devices to the targeting component 1134, as well as device indicators (e.g., IP addresses, devices names, etc.) for one or more of the voice-enabled devices in the ranked list of devices. The targeting component 1134 may then perform techniques to determine a target device (e.g., a device to perform the requested operation), and provide various data to the speechlet 1007. For instance, the targeting component 1134 may provide the speechlet 1007 with various device identifiers of the voice-enabled devices, the determined target device, the determined intent and/or command, etc.

The speechlet 1007 and/or NLU component 150 may determine a domain based on the intent and, based on this determination, route the request corresponding to the audio data to the appropriate domain speechlet, such as the illustrated domain speechlets 1140. The domain speechlet 1140 may comprise any type of device or group of devices (e.g., hardware device, virtual devices or partitions, server, etc.), and may receive the text data and/or an intent associated with the audio signals and may determine how to respond to the request. For instance, the intent for a command "turn on study light" may be routed to a smart-home speechlet 164, which controls generation of directive data for sending to voice-enabled devices for outputting audio confirming that an accessory device with the naming indicator of "study light" has been activated.

Various types of domain speechlets 1140 may be used to determine which devices to send commands to and/or to use in response to a user utterance, as well as the appropriate response and potential additional content (e.g., audio data). For example, the domain speechlets 1140 may include a third party skills domain speechlet 1140, which may handle intents associated with gaming, productivity, etc., a music domain speechlet, which may handle intents associated with music play requests (e.g., Amazon Music, Pandora, Spotify, iHeart, etc.), and/or an information domain speechlet, which may handle requests for information associated, for example, with the status of a particular device and/or content being utilized and/or output by a particular device and/or group of devices.

After the domain speechlet 1140 generates the appropriate command, which may be described herein as directive data, based on the intent of the user, and/or provides additional content, such as audio data, to be output by one of the voice-enabled devices, the domain speechlet 1140 may provide this information back to the speech system 142, which in turns provides some or all of this information to a text-to-speech (TTS) engine 1152. The TTS engine 1152 then generates an actual audio file for outputting the second audio data determined by the domain speechlet 1140. After generating the file (or "audio data"), the TTS engine 1152 may provide this data back to the speech system 142.

The speech system 142 may then publish (i.e., write) some or all of this information to an event bus 1146. That is, the speech system 142 may provide information regarding the initial request (e.g., the speech, the text, the domain/intent, etc.), the response to be provided to the voice-enabled device, or any other information pertinent to the interaction between the voice-enabled device and the speech-processing system 142 to the event bus 1146.

Within the speech-processing system 142, one or more components or services may subscribe to the event bus 1146 so as to receive information regarding interactions between user devices and the speech-processing system 142. In the illustrated example, for instance, the device management component 1148 may subscribe to the event bus 1146 and, thus, may monitor information regarding these interactions. In some examples, monitoring information in the event bus 1146 may comprise messages between various components of the speech-processing system 142. For example, the targeting component 1134 may monitor the event bus 1146 to identify device state data for voice-enabled devices. In some examples, the event bus 1146 may "push" or send indications of events and/or device state data to the targeting component 1134. Additionally, or alternatively, the event bus 1146 may be "pulled" where the targeting component 1134 sends requests to the event bus 1146 to provide an indication of device state data for a voice-enabled device. The event bus 1146 may store indications of the device states for the devices, such as in a database (e.g., user registry 140), and using the stored indications of the device states, send the device state data for voice-enabled devices to the targeting component 1134. Thus, to identify device state data for a device, the targeting component 1134 may send a request to the event bus 1146 (e.g., event component) to provide an indication of the device state data associated with a device, and receive, from the event bus 1146, the device state data that was requested.

The device management component 1148 functions to monitor information published to the event bus 1146 and identify events that may trigger action. For instance, the device management component 1148 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 1148 may reference the user registry 140 to determine which voice-enabled devices are associated with secondary devices, as well as determine device types, states, and other capabilities of these secondary devices. For instance, the device management component 1148 may determine, from the information published to the event bus 1146, an identifier associated with the voice-enabled device making the corresponding request or the voice-enabled device selected to respond to or act upon the user utterance. The device management component 1148 may use this identifier to identify, from the user registry 140, a user account associated with the voice-enabled device. The device management component 1148 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1148 may determine whether a particular event identified is associated with supplemental content. That is, the device management component 1148 may write, to a datastore, indications of which types of events and/or which primary content or responses are associated with supplemental content. In some instances, the speech-processing system 142 may provide access to third-party developers to allow the developers to register supplemental content for output on secondary devices for particular events and/or primary content. For example, if a voice-enabled device is to output that the weather will include thunder and lightning, the device management component 1148 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1148 may store an association between the primary response or content (e.g., outputting of information regarding the world's largest mammal) and corresponding supplemental content (e.g., the audio data, image data, or the like). In some instances, the device management component 1148 may also indicate which types of secondary devices are to output which supplemental content. For instance, in the instant example, the device management component 1148 may store an indication that secondary devices of a class type "tablet" are to output a picture of a blue whale. In these and other instances, meanwhile, the device management component 1148 may store the supplemental content in association with secondary-device capabilities (e.g., devices with speakers output the audio commentary, devices with screens output the image, etc.).

The device management component 1148 may also determine how to transmit response and/or supplement content (and/or information acquiring the content) to the voice-enabled devices and/or the secondary devices. To make this determination, the device management component 1148 may determine a device type of the voice-enabled devices and/or secondary devices, capabilities of the device(s), or the like, potentially as stored in the user registry 140. In some instances, the device management component 1148 may determine that a particular device is able to communicate directly with the speech-processing system 142 (e.g., over WiFi) and, thus, the device management component 1148 may provide the response and/or content directly over a network 106 to the secondary device (potentially via the speech system 142). In another example, the device management component 1148 may determine that a particular secondary device is unable to communicate directly with the speech-processing system 142, but instead is configured to communicate with a voice-enabled device in its environment over short-range wireless networks. As such, the device management component 1148 may provide the supplement content (or information) to the speech system 142, which in turn may send this to the voice-enabled device, which may send the information over a short-range network to the secondary device.

The speech-processing system 142 may further include the user registry 140 that includes data regarding user profiles as described herein. The user registry 140 may be located part of, or proximate to, the speech-processing system 142, or may otherwise be in message with various components, for example over the network 106. The user registry 140 may include a variety of information related to individual users, accounts, etc. that interact with the voice-enabled devices, and the speech-processing system 142. For illustration, the user registry 150 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 140 may store indications of associations between various voice-enabled devices and/or secondary device, such as virtual clusters of devices, states of devices, and associations between devices and audio-session queues. The user registry 140 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 1007 and/or the domain speechlets 1140 may determine, based on the stored device states in the user registry 140, a current device state of the voice-enabled devices. Rather than receiving device states for the voice-enabled devices, in metadata, the device states may already have been determined or received and stored in the user registry 140. Further, the user registry 140 may provide indications of various permission levels depending on the user. As an example, the speech system 142 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1146 may publish different events which indicate device states to various entities or components that subscribe to the event bus 1146. For instance, if an event of "turn on office lights" occurs for a voice-enabled device, the event bus 1146 may publish the indication of this event, and thus the device state of the voice-enabled device from which the audio data was received may be determined. Thus, various components, such as the targeting component 1134, may be provided with indications of the various device states via the event bus 1146. The event bus 1146 may further store and/or update device states for the voice-enabled devices in the user registry 140. The components of the speech-processing system 142 may query the user registry 140 to determine device states.

A particular user profile may include a variety of data that may be used by the system 142. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

The functionality-management component 154 may be configured to utilize information from the analyses performed by other components, such as a device-usage component to identify a device as the primary device and other devices as secondary devices. For example, the functionality-management component 154 may be configured to generate data indicating which device is the primary device and which device(s) are the secondary devices. The functionality-management component 154 may also be configured to generate and/or store data indicating that a primary device has been assigned such that device arbitration may be performed when a user request to perform an action is received, as described more fully below.

Additionally, or alternatively, the functionality-management component 154 may be configured to maintain a device as the primary device until, for example, a triggering event occurs. The triggering event may include, for example, the passage of a predetermined amount of time, detection of a change in the environment in which the devices are situated, such as the movement of a user within the environment, the detection of a new device in the environment, the removal of a device from the environment, and/or a change in time from a predefined first time period to a second predefined time period. The triggering event may also include receiving an instruction from the remote system 104 and/or one or more other devices to cease operating as the primary device. Based at least in part on identifying a device as a primary device, an instruction may be generated and sent to one or more of the secondary devices that causes the functionality to be disabled on the secondary devices.

The arbitration component 156 may be configured to perform device arbitration to determine which device to instruct to respond to a user request for performance of an action. For example, while a device is identified as the primary device and the other devices are identified as secondary devices with a certain functionality disabled, input data representing a request for one of the devices to perform an action may be received at the remote system 104 associated with the devices and/or at the primary device. In these examples, the remote system 104 and/or the primary device may analyze the input data to determine which of the devices is to perform the action. Generally, in instances where the input data is received from the primary device, the remote system 104 and/or the primary device may determine that the user intends for the action to be performed by that device. However, when functionality management is performed as disclosed herein, particularly when such operations result in wake-word functionality being disabled on secondary devices, the remote system 104 and/or the primary device may receive the input data from the primary device based at least in part on the primary device being the only device configured to detect a wake word and transmit audio data to the remote system 104. In these and other examples, the remote system 104 and/or the primary device may identify, determine, and/or receive an indication that a primary device and one or more secondary devices have been identified, and based at least in part on this indication, the remote system 104 and/or the primary device may perform device-arbitration operations to determine whether the primary device and/or one or more of the secondary devices should perform the action.

Figure 12:
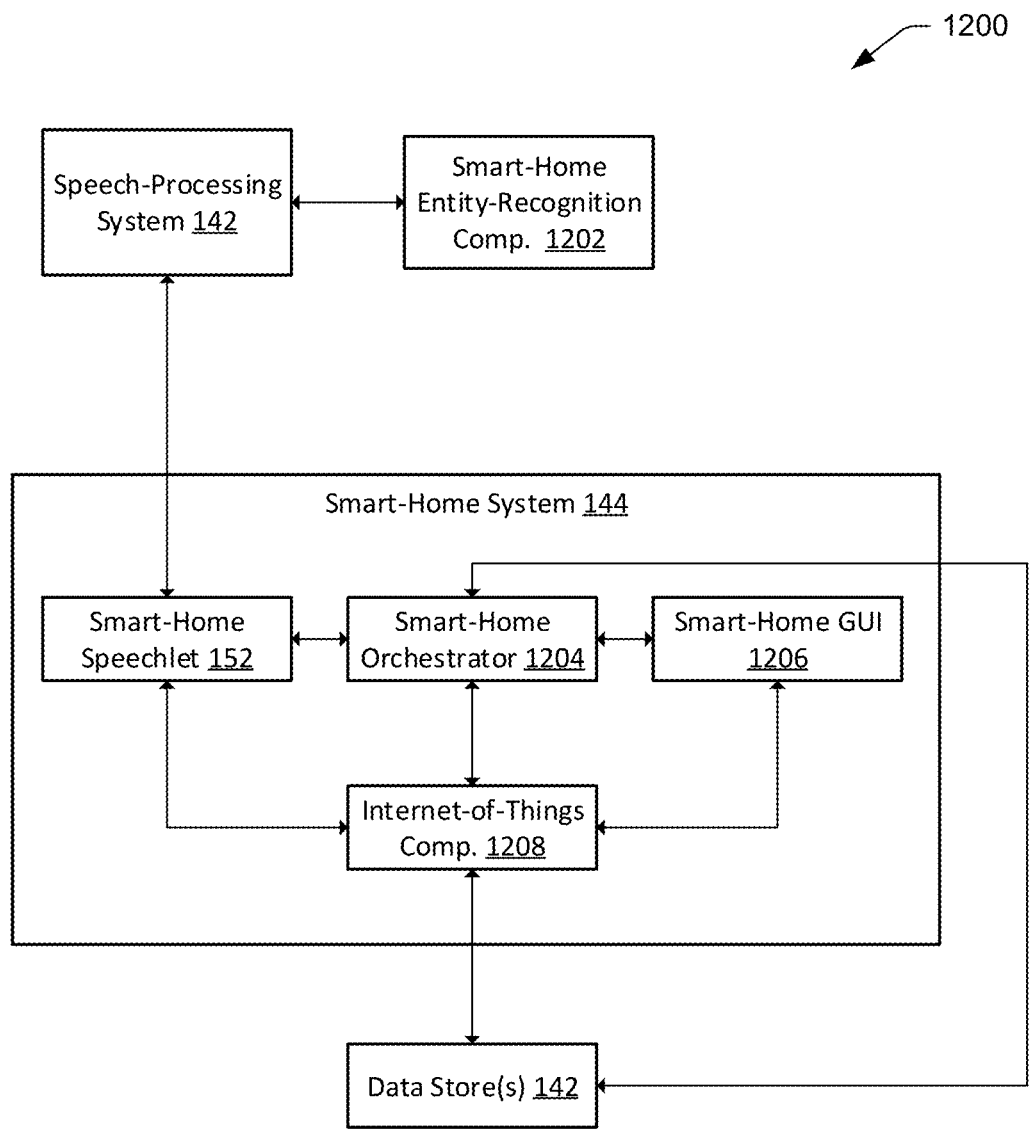
FIG. 12 illustrates a conceptual diagram of components of a smart-home system.

FIG. 12 illustrates a conceptual diagram of a smart-home system 144, which may be a component of the remote system 104 and may be utilized to determine which device to send instructions to in instances where a device is identified as a primary device and where other devices are identified as secondary devices. The smart-home system 144 may include components described above with respect to FIG. 1, such as a smart-home speechlet 152. The smart-home system 144 may also be configured to send data to and receive data from other components of a remote system and/or one or more other systems. For example, the other components may include a speech-processing system 142, and one or more data stores 1250. The smart-home system 144 may also include components such as a smart-home orchestrator 1204, a smart-home graphical user interface (GUI) 1206, and/or an internet-of-things component 1208. Each of these components will be described in detail below.

As described herein, a user may interact with an accessory device using tactile input to the accessory device, voice input to a voice-enabled device, and/or input to an application residing on and/or accessible to a personal device. When a user interacts with an accessory device using voice input to a voice-enabled device, audio data representing user utterances may be received at the speech-processing system 142. The speech-processing system 142 may analyze the audio data and/or corresponding text data generated, by way of example, using an ASR component, to determine that the user utterance represents an intent to control an accessory device. To determine the intent associated with the user utterance, the speech-processing system 142 may utilize a smart-home entity-recognition component 1202, which may be utilized to inform one or more intents available to the speech-processing system 142 and/or to inform one or more values associated with the intents. For example, the user utterance of "turn off bedroom lights" may be analyzed by the speech-processing system 142. The smart-home entity-recognition component 1202 may train or otherwise provide data to the speech-processing system 142 indicating intents associated with operation of accessory devices, such as "turn on," "turn off," "activate," "deactivate," "dim," "brighten," "lock," "unlock," etc. The smart-home entity-recognition component 1202 may additionally, or alternatively, provide data indicating identifiers and/or payloads associated with such intents, such as "light," "lights," "lock," "outlet," "switch," etc.

The speech-processing system 142 may be configured to determine that the intent corresponds to an operation configured to be performed by the smart-home system 144, and based at least in part on such a determination, the speech-processing system 142 may provide the intent data and/or other data associated with the request to the smart-home speechlet 152 of the smart-home system 144. The smart-home orchestrator 1204 may be configured to receive data indicating that the smart-home speechlet 152 has been invoked to determine a directive to be performed with respect to an accessory device and may query one or more other components of the smart-home system 144 to effectuate the request. For example, the smart-home orchestrator 1204 may query the internet-of-things component 1208 to identify naming indicators associated with accessory devices for a particular user account. The internet-of-things component 1208 may query the data store(s) 1250 and/or the user account for such naming indicators. The internet-of-things component 1208 may return the naming indicators to the smart-home speechlet 152, which may identify which naming indicator corresponds to the identified target device from the user utterance.

Additionally, or alternatively, as mentioned above, the accessory devices may be operated based at least in part on input data received from an application residing on and/or accessible to a personal device, such as a mobile phone and/or computer. The smart-home GUI 1206 may be utilized to receive the input data and/or to display recommendations and/or requests to a user. For example, the smart-home GUI 1206 may be utilized to display a request to confirm that a selected accessory device is the desired device to be acted upon.

Figure 13:
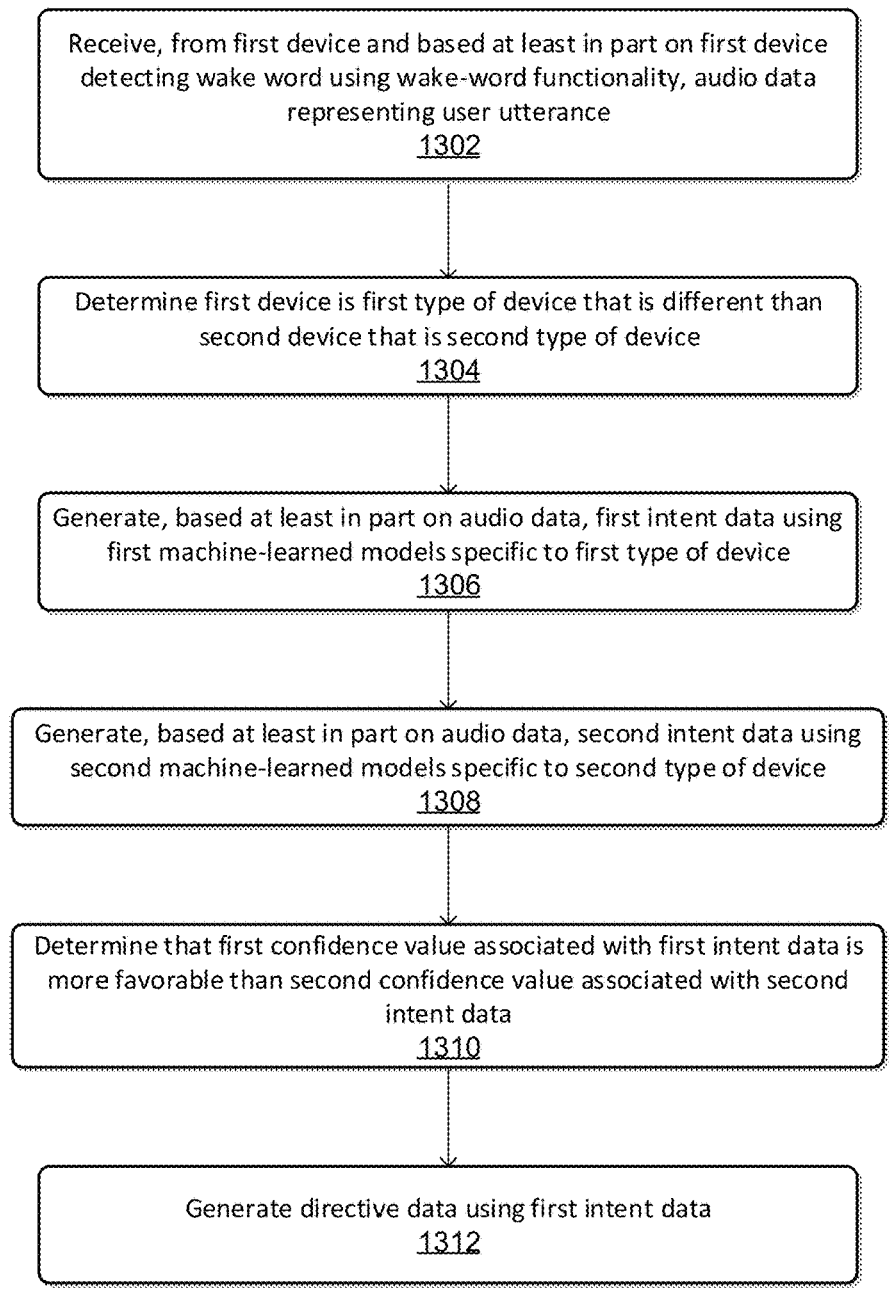
FIG. 13 illustrates a flow diagram of an example process for functionality management for a group of devices.

FIG. 13 illustrates processes for functionality management for devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-12, although the processes may be implemented in a wide variety of other environments, architectures and systems.

FIG. 13 illustrates a flow diagram of an example process 1300 for functionality management for a group of devices. The order in which the operations or steps are described is not intended to be construed as a limitation, and any number of the described operations may be combined in any order and/or in parallel to implement process 1300.

At block 1302, the process 1300 may include receiving, from the first device and based at least in part on the first device detecting a wake word using the wake-word functionality, audio data representing a user utterance. For example, as described more fully above, the systems and processes described herein may be utilized to determine that the first device in a group of devices is to be the primary device with respect to one or more functionalities, while one or more other devices in the group may be designated as secondary devices with the functionality disabled. In examples where the functionality in question is wake-word detection, a user may speak a user utterance, which may be captured by microphones of the first device. The first device, being the primary device and having the wake-word functionality enabled, may detect the presence of the wake word and may generate audio data representing the user utterance to be sent to the remote system. The audio data may be received by the remote system.

At block 1304, the process 1300 may include determining the first device is a first type of device that is different than the second device that is a second type of device. For example, device types may include some or all of the device types discussed with respect to FIG. 1. To illustrate, the first device may be a mobile phone, earbuds, and/or a watch, while the second device may be a voice-enabled device.

At block 1306, the process 1300 may include generating, based at least in part on the audio data, first intent data using first machine-learned models specific to the first type of device. For example, automatic speech recognition techniques may be utilized to generate text data corresponding to the audio data, and natural language understanding techniques may be utilized to generate the intent data. Automatic speech recognition and natural language understanding are described in more detail with respect to FIG. 11. In these examples, the machine-learned models may be associated with or otherwise configured to generate intent data from audio data received from devices with given device types. Once the device type is identified, the model(s) specific to the device type may be utilized to generate the intent data.

At block 1308, the process 1300 may include generating, based at least in part on the audio data, second intent data using second machine-learned models specific to the second type of device. Generating the second intent data may be performed in the same or a similar manner as described with respect to block 1306.

At block 1310, the process 1300 may include determining that a first confidence value associated with the first intent data is more favorable than a second confidence value associated with the second intent data. For example, a confidence score and/or other value indicating a confidence that the intent data corresponds to the user utterance may be generated. To illustrate, intent data indicating a intent to output audio corresponding to "Song A" by "Artist X" may have a more favorable confidence value than an intent to output audio corresponding to "Song A" by "Artist Y" for a given user utterance. The confidence values may also be influenced by the quality of the signal received from the devices, such as in terms of signal strength and/or signal-to-noise ratio.

At block 1312, the process 1300 may include generating directive data using the first intent data. Generating the directive data may be performed in the same or a similar manner as described with respect to FIG. 1. Specifically, in examples, one or more speechlets may generate directive data indicating an instruction for one or more devices to perform an action in response to the user utterance.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
computer-readable media storing computer-executable instructions that, when executed by the one or more processors, cause the one or more processors to perform operations comprising:
identifying a first voice-enabled device associated with a user account, the first voice-enabled device including a first trigger-expression component configured to detect a wake word from audio data representing a user utterance;
identifying a second voice-enabled device associated with the user account, the second voice-enabled device including a second trigger-expression component configured to detect the wake word;
determining, from first historical usage data associated with the first voice-enabled device and second historical usage data associated with the second voice-enabled device, that the first trigger-expression component is associated with a first performance value for detection of the wake word that is more favorable than a second performance value for detection of the wake word associated with the second trigger-expression component, the first performance value indicating how well the first voice-enabled device detects the wake word, the second performance value indicating how well the second voice-enabled device detects the wake word;
determining the first voice-enabled device is to be a primary device from the first performance value being more favorable than the second performance value;
sending, to the second voice-enabled device and in response to identifying the first voice-enabled device as the primary device, an instruction to disable the second trigger-expression component;
receiving, from the first voice-enabled device and in response to the first voice-enabled device detecting the wake word, the audio data;
determining, from the audio data, intent data indicating that the user utterance includes a request to perform an action; determining that the second voice-enabled device is associated with functionality for performing the action; and
sending, to the second voice-enabled device, directive data instructing the second voice-enabled device to perform the action.

2. The system of claim 1, wherein the first voice-enabled device includes a first short-range communication component, the second voice-enabled device includes a second short-range communication component, the instruction comprises a first instruction, the primary device comprises a first primary device, and the operations further comprise:
determining that the second short-range communication component has been configured to communicate with an accessory device;
determining that an association between the first short-range communication component and the accessory device is absent;
identifying, from the second short-range communication component being configured to communicate with the accessory device and the association between the first short-range communication component and the accessory device being absent, the second voice-enabled device as a second primary device with respect to short-range communication; and
sending, to the first voice-enabled device and in response to identifying the second voice-enabled device as the second primary device with respect to short-range communication, a second instruction to disable the first short-range communication component.

3. The system of claim 1, the operations further comprising:
determining that the first voice-enabled device receives power from a power outlet associated with an environment in which the first voice-enabled device is disposed during a period of time;
determining that the second voice-enabled device receives power from a battery of the second-voice-enabled device during the period of time; and
wherein determining the first voice-enabled device is to be the primary device comprises determining the first voice-enabled device is to be the primary device from determining that the first voice-enabled device receives power from the power outlet during the period of time and from determining that the second voice-enabled device receives power from the battery during the period of time.

4. The system of claim 1, wherein the instruction comprises a first instruction, the audio data comprises first audio data, the user utterance comprises a first user utterance, and the operations further comprise:
sending, from sending the directive data, a second instruction to the second voice-enabled device, the second instruction configured to cause the second trigger-expression component to activate for a period of time;
receiving, during the period of time and in response to the second voice-enabled device detecting the wake word, second audio data representing a second user utterance;
determining that the period of time has lapsed; and
sending, from determining that the period of time has lapsed, a third instruction to the second voice-enabled device, the third instruction configured to disable the second trigger-expression component.

5. A method, comprising:
determining that a functionality enabled by a first device is enabled by a second device;
determining the first device is to be a primary device used to perform the functionality based at least in part on a first value associated with the first device and a second value associated with the second device, the first value indicating how well the first device detects a wake word, the second value indicating how well the second device detects the wake word;

causing, based at least in part on determining the first device is to be the primary device, the functionality to be disabled on the second device;

receiving, from the first device, input data requesting an action to be performed;

determining that the second device is configured to perform the action; and sending, based at least in part on determining that the second device is configured to perform the action, a first instruction to the second device, the first instruction configured to cause the functionality to activate for a period of time.

6. The method of claim 5, the method further comprising:
storing functionality-management data indicating that, for the functionality:
  the first device has previously been selected as the primary device; and
  the second device has previously been selected as a secondary device; and
wherein determining the first device is to be the primary device comprises determining the first device is to be the primary device based at least in part on the functionality-management data.

7. The method of claim 5, further comprising:
determining that the first device receives power from a power outlet during a time period;
determining that the second device receives power from a battery during the time period; and
wherein determining the first device is to be the primary device comprises determining the first device is to be the primary device based at least in part on determining that the first device receives power from the power outlet during the time period and the second device receives power from the battery during the time period.

8. The method of claim 5, further comprising:
receiving, at the first device and from the second device, first capability data indicating functionalities including the functionality that the second device is configured to perform;
storing, at the first device, second capability data indicating that the first device is configured to perform the functionality, wherein determining that the functionality is enabled by the first device and the second device comprises determining that the functionality is enabled by the first device and the second device based at least in part on the first capability data and the second capability data;
determining, based at least in part on usage data associated with the first device and the second device, that the functionality is performed more by the first device than the second device, wherein determining the first device is to be the primary device comprises determining the first device is to be the primary device based at least in part on determining that the functionality is performed more by the first device than the second device; and
wherein causing the functionality to be disabled on the second device comprises causing the functionality to be disabled based at least in part on sending, from the first device, an instruction to the second device, the instruction causing the functionality to be disabled.

9. The method of claim 5, further comprising:
storing usage pattern data indicating:
  a first time period of a day that at least one of the first device or the second device receives a first amount of input below a threshold amount of input;
  a second time period of the day that at least one of the first device or the second device receives a second amount of input from above the threshold amount of input; and
  wherein determining the first device is to be the primary device comprises determining the first device is to be the primary device during the first time period.

10. The method of claim 5, wherein the functionality comprises a wake-word functionality, and the method further comprises:
receiving, from the first device and based at least in part on the first device detecting the wake word using the wake-word functionality, audio data representing a user utterance;
determining the first device is a first type of device that is different than the second device that is a second type of device;
generating, based at least in part on the audio data, first intent data using first models specific to the first type of device;
generating, based at least in part on the audio data, second intent data using second models specific to the second type of device;
determining that a first confidence value associated with the first intent data is more favorable than a second confidence value associated with the second intent data; and
generating directive data using the first intent data.

11. The method of claim 5, wherein the first device is situated in a first environment, the second device is situated in a second environment, and the method further comprises:
determining, based at least in part on at least one of first audio data or first image data from the first device, that a user is present in the first environment, wherein determining the first device is to be the primary device comprises determining the first device is to be the primary device based at least in part on determining that the user is present in the first environment;
determining, based at least in part on at least one of second audio data or second image data from the second device, that the user has moved from the first environment to the second environment;
determining, based at least in part on determining that the user has moved from the first environment to the second environment, the second device is to be the primary device;
causing, based at least in part on determining the second device is to be the primary device, the functionality to be enabled on the second device; and
causing, based at least in part on determining the second device is to be the primary device, the functionality to be disabled on the first device.

12. A system comprising:
one or more processors; and
computer-readable media storing computer-executable instructions that, when executed by the one or more processors, cause the one or more processors to perform operations comprising:
  determining that a functionality enabled by a first device is enabled by a second device;
  determining the first device is to be a primary device used to perform the functionality based at least in part on a first value associated with the first device and a second value associated with the second device, the first value indicating how well the first device detects a wake word, the second value indicating how well the second device detects the wake word;
causing, based at least in part on determining the first device is to be the primary device, the functionality to be disabled on the second device;
receiving, from the first device, input data requesting an action to be performed;
determining that the second device is configured to perform the action;
sending, based at least in part on determining that the second device is configured to perform the action, a first instruction to the second device, the first instruction configured to cause the functionality to activate; and
sending, based at least in part on determining that a period of time has lapsed, a second instruction to the second device, the second instruction configured to disable the functionality.

13. The system of claim 12, the operations further comprising:
storing functionality-management data indicating that, for the functionality:
the first device has previously been selected as the primary device; and
the second device has previously been selected as a secondary device; and
wherein determining the first device is to be the primary device comprises determining the first device is to be the primary device based at least in part on the functionality-management data.

14. The system of claim 12, the operations further comprising:
determining that the first device receives power from a power outlet during a time period;
determining that the second device receives power from a battery during the time period; and
wherein determining the first device is to be the primary device comprises determining the first device is to be the primary device based at least in part on determining that the first device receives power from the power outlet during the time period and the second device receives power from the battery during the time period.

15. The system of claim 12, the operations further comprising:
receiving, at the first device and from the second device, first capability data indicating functionalities including the functionality that the second device is configured to perform;
storing, at the first device, second capability data indicating that the first device is configured to perform the functionality, wherein determining that the functionality is enabled by the first device and the second device comprises determining that the functionality is enabled by the first device and the second device based at least in part on the first capability data and the second capability data;
determining, based at least in part on usage data associated with the first device and the second device, that the functionality is performed more by the first device than the second device, wherein determining the first device is to be the primary device comprises determining the first device is to be the primary device based at least in part on determining that the functionality is performed more by the first device than the second device; and
wherein causing the functionality to be disabled on the second device comprises causing the functionality to be disabled based at least in part on sending, from the first device, an instruction to the second device, the instruction causing the functionality to be disabled.

16. The system of claim 12, the operations further comprising:
storing usage pattern data indicating:
a first time period of a day that at least one of the first device or the second device receives a first amount of input below a threshold amount of input;
a second time period of the day that at least one of the first device or the second device receives a second amount of input above the threshold amount of input;
wherein determining the first device is to be the primary device comprises determining the first device is to be the primary device during the first time period.

17. The system of claim 12, the operations further comprising:
determining that audio representing a user utterance received at a first microphone of the first device has a first signal strength;
determining that the audio received at a second microphone of the second device has a second signal strength, the second signal strength being greater than the first signal strength;
causing, at the second device, the functionality to be activated based at least in part on the second signal strength being greater than the first signal strength; and
causing, at the first device, the functionality to be deactivated based at least in part on the second signal strength being greater than the first signal strength.

18. The system of claim 12, the operations further comprising:
receiving, based at least in part on a predefined schedule and from the first device, status data indicating that the first device is in an active state;
determining that a state change has occurred, the state change indicating that at least one of:
the first device has transitioned to a deactivated state; or
a state of the first device is undetermined; and
causing, based at least in part on determining that the state change has occurred, the functionality to be enabled on the second device.

19. The system of claim 12, wherein the first device is situated in a first environment and the second device is situated in a second environment, the operations further comprising:
determining, based at least in part on at least one of first audio data or first image data from the first device, that a user is present in the first environment, wherein determining the first device is to be the primary device is based at least in part on determining that the user is present in the first environment;
determining, based at least in part on at least one of second audio data or second image data from the second device, that the user has moved from the first environment to the second environment;
determining, based at least in part on determining that the user has moved from the first environment to the second environment, the second device is to be the primary device;
causing, based at least in part on determining the second device is to be the primary device, the functionality to be:
enabled on the second device; and
disabled on the first device.

* * * * *